(12) United States Patent
Chakiris et al.

(10) Patent No.: US 7,537,152 B2
(45) Date of Patent: May 26, 2009

(54) DELIVERY OF VALUE IDENTIFIERS USING SHORT MESSAGE SERVICE (SMS)

(75) Inventors: Phil M. Chakiris, Atlanta, GA (US); Phillip C. Graves, Atlanta, GA (US); John David Guest, Hampshire (GB); Leslie George Lowin, West Sussex (GB)

(73) Assignee: e2interative, Inc., Atlanta, GA (US)

( * ) Notice: Subject to any disclaimer, the term of this patent is extended or adjusted under 35 U.S.C. 154(b) by 0 days.

(21) Appl. No.: 11/778,698

(22) Filed: Jul. 17, 2007

(65) Prior Publication Data

US 2008/0003977 A1 Jan. 3, 2008

Related U.S. Application Data

(63) Continuation-in-part of application No. 11/233,704, filed on Sep. 23, 2005, now Pat. No. 7,472,822.

(60) Provisional application No. 60/664,188, filed on Mar. 23, 2005, provisional application No. 60/885,044, filed on Jan. 16, 2007.

(51) Int. Cl.
*G06F 17/00* (2006.01)
(52) U.S. Cl. .................................. 235/375
(58) Field of Classification Search ............. 235/375
See application file for complete search history.

(56) References Cited

U.S. PATENT DOCUMENTS

| | | | |
|---|---|---|---|
| 5,903,874 A | 5/1999 | Leonard et al. | |
| 6,058,382 A | 5/2000 | Kasai et al. | |
| 6,215,999 B1 | 4/2001 | Dorenbosch | |
| 6,295,522 B1 | 9/2001 | Boesch | |
| 7,171,199 B1 | 1/2007 | Rahman | |
| 7,249,175 B1 | 7/2007 | Donaldson | |
| 7,363,265 B2 | 4/2008 | Horgan | |
| 2002/0016749 A1 | 2/2002 | Borecki et al. | |
| 2002/0115424 A1* | 8/2002 | Bagoren et al. | 455/408 |
| 2003/0028481 A1 | 2/2003 | Flitcroft et al. | |
| 2003/0126079 A1 | 7/2003 | Roberson et al. | |
| 2003/0200179 A1 | 10/2003 | Kwan | |
| 2003/0204457 A1 | 10/2003 | Arias | |
| 2006/0035632 A1* | 2/2006 | Sorvari et al. | 455/418 |
| 2006/0100927 A1* | 5/2006 | Zormati | 705/14 |
| 2006/0229985 A1 | 10/2006 | Lalwani et al. | |
| 2007/0214080 A1 | 9/2007 | Babi et al. | |
| 2008/0010215 A1 | 1/2008 | Rackley, III et al. | |
| 2008/0109279 A1 | 5/2008 | Csoka | |
| 2008/0162341 A1 | 7/2008 | Zimmer et al. | |

\* cited by examiner

*Primary Examiner*—Karl D Frech
*Assistant Examiner*—Tae W Kim
(74) *Attorney, Agent, or Firm*—Hunton & Williams LLP

(57) ABSTRACT

The present invention discloses systems and methods for managing the transfer of value to a third party using short messaging Services (SMS) communications. Methods for using SMS to transfer value to a third party comprises providing the payment card to a user; activating the payment card; initiating a transaction associated with the payment card; receiving via SMS communications an identifier associated with the payment card; associating value with the payment card; determining an amount of value associated with the payment card; providing an indication of the amount of value associated with the bill payment card to the payment card user via SMS communications; associating at least one third party with the payment card; selecting a third party to be associated with the transaction; receiving from the user an amount of value to transfer to the third party; transferring to the third party the amount of value; and terminating the transaction.

9 Claims, 10 Drawing Sheets

DELIVERY OF VALUE IDENTIFIERS USING SHORT MESSAGE SERVICE (SMS)

CROSS-REFERENCE TO RELATED APPLICATIONS

This application is a continuation-in-part of, and claims priority to U.S. patent application Ser. No. 11/233,704, filed on Sep. 23, 2005 now U.S. Pat. No. 7,472,822, which in turn claims the benefit of U.S. Provisional Patent Application No. 60/664,188 filed Mar. 23, 2005. This application also claims priority to U.S. Provisional Patent Application 60/885,044 filed on Jan. 16, 2007 and U.S. patent application Ser. No. 11/672,082 filed on Feb. 7, 2007. Each of these applications is incorporated herein by reference in its entirety.

BACKGROUND OF THE INVENTION

This invention relates to the delivery of identifiers via short messaging service (SMS) for making payments to a third party.

Communication devices and other electronic components, especially mobile telephones, are a very common consumer product. In many countries, a popular type of payment arrangement for service associated with a device (such as telecommunication service for a mobile telephone) is for the user to make payments to credit their account in advance of using the mobile telephone. This type of payment is commonly known as "pre-pay". The process of making a payment and crediting the user's account is commonly known as a "top-up", which term reflects the normal manner of usage in which the user frequently tops up their account by relatively small amounts. Many pre-pay systems allow the user to make payments at a variety of retail outlets, thereby allowing the user to pay for a top-up at a location which is convenient to them.

Conventional stored value accounts such as mobile telephone accounts are reloaded or "topped up" in a two-step process. First, the customer purchases at a retail outlet a stored value card having a PIN (e.g., of up to 16 or more letters and/or digits) associated with a specific value such as $20. Second, the customer accesses a central processor, e.g., by calling an 800 number on the back of the card, and requests to add the card's value to the customer's account. During the call, the customer typically provides card identification information such as a PIN as well as information sufficient to identify the customer's account, such as a phone number associated with the account and the name of the account provider. For instance, a customer attempting to add the card value to a wireless phone account may call an 800 number on the back of the card to access a centralized VRU. In response to various VRU prompts, the customer may input the card PIN, the name of the customer's service provider (such as AT&T), and the phone number corresponding to the wireless account. The central VRU system may then cause the card value to be added to the customer's wireless account.

Many of these cards are still printed, stored and transported by the Mobile Operators under highly secure conditions to the retailer or distributor as they are effectively active (i.e. useable and therefore valuable) as soon as they are printed. As the market has expanded, the logistical complexity of maintaining this process for such large numbers of transactions and the costs associated with managing the many opportunities for fraud and system abuse led the Network Operators to seek other alternatives. Often, no record is kept of where a card has been distributed, as the route to market is often quite elaborate. Some small stores buy cards at cash and carries, and few if any systems have been developed that can cancel all stolen cards. Lorries full of cards have been stolen; staff in stores have sold cards and pocketed the money themselves. Cards (or other physical embodiments of a PIN or other identifier) are often equivalent to money.

More recently electronic payment systems of crediting a mobile phone account have been developed. Some of these systems use magnetic stripe cards in which limited user details were contained within a magnetic stripe. In some recent systems, cards are distributed in an "inactive state" and activated at the point of sale ("POS").

Despite intense efforts by the mobile operators to promote an earlier electronic system, market acceptance has been slow. Cards have not reduced in popularity, it is simply that the cards are expensive for the mobile operators and have been encouraged to decline, and alternative systems are being promoted and made increasingly attractive.

Other systems enable customers to replenish prepaid mobile phone accounts by sending an SMS message to a centralized system. For instance, U.S. Application Publication No. 2002/0115424 to Bagoren discloses one such system. Other relevant systems includes those described in the following patents and applications: U.S. Pat. No. 6,375,073 to Aebi et al.; U.S. Pat. No. 6,070,067 to Nguyen et al.; and U.S. Patent Application Publication No. 2002/0187772 to Hyyppa et al. The disclosures of all references mentioned herein are incorporated herein by reference in their entireties.

There are several disadvantageous costs associated with many prior art systems and methods: a cost of IVR provisioning; a cost of Customer Services for high rate of fall-out from IVR (typing in a number consisting of 16 digits can be difficult and can involve error); cost of secure delivery; cost of wastage, loss, and theft; and a high cost for retailer to hold all denominations of all service providers. Also, the end-user may be unlikely to find the right denomination for the right operator at all merchants. Also, the process can be time-consuming for the customer.

In addition, many people do not like carrying yet more plastic cards. Most plastic cards are not transferable. In other words, a first user cannot top up a second user's account with the first user's card. The cards from many service providers do not have a phone number on them, so they can get mixed up. The unregistered cards are often used once and discarded. As they are plastic, they are more expensive than the cards they replace.

It is commonplace for customers to purchase goods or services on credit and later receive bills from the provider of the goods or services requesting payment. Traditionally, the customer satisfies the bill by providing payment in the form of a note, draft (e.g., a check), or money order. Alternatively, a customer may satisfy the debt by use of a credit card, either by having the amount owed to the biller each month automatically charged to the credit card or by entering credit card information on an invoice authorizing the biller to charge the credit card for the amount owed on the invoice. More recently, online payment methods have become available, where a customer may make payments using the Internet, typically through a biller's or a bank's website These known methods and systems generally require a bank, checking account, or a credit card. Some customers, however, may not have or may not prefer to use their bank account or credit card when making certain payments. A typical alternative is the use of a money order. A money order, however, has its own drawbacks, including inconvenience, the payment of additional fees, and postage.

It is desirable to provide an improved system and method for adding value to a customer's account with a third party.

SUMMARY OF THE INVENTION

In some embodiments, the present invention discloses systems and methods for managing the transfer of value to a third party using short messaging Services (SMS) communications. Methods for using SMS to transfer value to a third party comprises providing the payment card to a user; activating the payment card; initiating a transaction associated with the payment card; receiving via SMS communications an identifier associated with the payment card; associating value with the payment card; determining an amount of value associated with the payment card; providing an indication of the amount of value associated with the bill payment card to the payment card user via SMS communications; associating at least one third party with the payment card; selecting a third party to be associated with the transaction; receiving from the user an amount of value to transfer to the third party; transferring to the third party the amount of value; and terminating the transaction.

These and other aspects will become apparent from the following description of exemplary embodiments of the invention taken in conjunction with the following drawings, although variations and modifications may be effected without departing from the spirit and scope of the novel concepts of the disclosure.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF EXEMPLARY EMBODIMENT(S)

Figure 1:
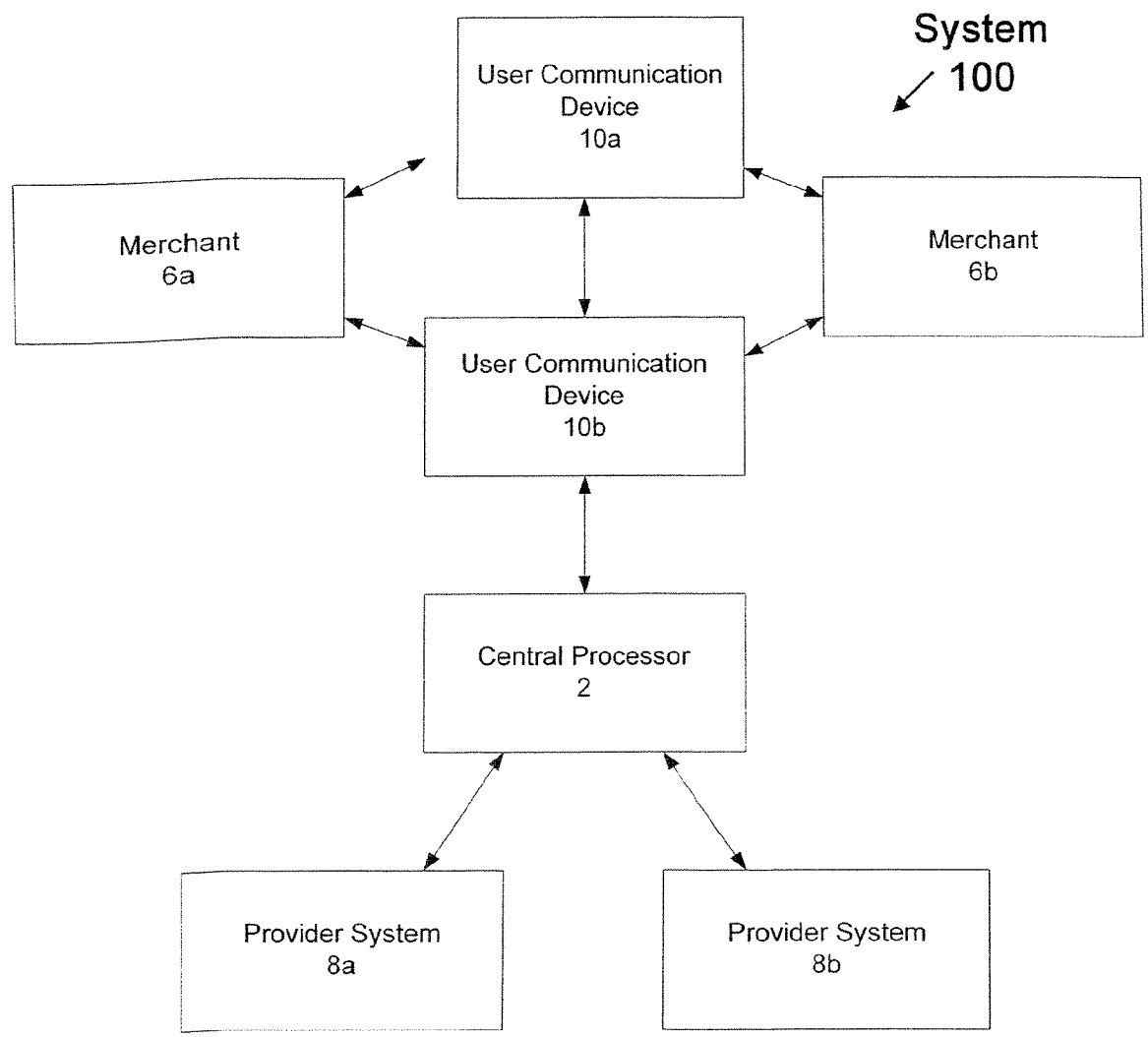
FIG. 1 shows a system for passing an identifier using short message service in accordance with some embodiments of the present invention.

Various embodiments of the present invention are directed to a system for adding value to a customer account. In some embodiments, a wireless communication device may send a value identifier via short message service ("SMS") to a centralized redemption processing system. For instance, the user may enter a PIN on a phone keypad of a mobile phone configured to send SMS messages. The communication may contain information sufficient to identify a customer account. For instance, the wireless communication device may be a phone associated with the account, wherein the phone number of the wireless device is encoded in the message and is sufficient to identify the account. The centralized system may then cause the value associated with the identifier to be added to the identified account.

In some embodiments, the centralized system may identify the account based on the communication. For instance, the centralized system may identify the account based on a phone number in the communication.

In some embodiments, the account may be managed by the centralized system. In other embodiments, the account may be managed by a separate account provider system. In embodiments where the account is managed by a separate system, the centralized system may cause the value to be inserted into the user's account, e.g., in any manner as described herein or in the patent applications referenced herein. In some embodiments, the user's account may be any account for a product or service (e.g. telecommunications service account, mobile phone account, utility service account, etc.).

In some embodiments, the centralized system may enable adding value associated with a PIN to a customer account (e.g., prepaid or post-paid). For instance, a customer having a pay-as-you-go wireless mobile phone service account may purchase a $20 prepaid phone card PIN in order to "top off" or recharge the airtime minutes in the account. The prepaid card comprises a PIN and a phone number. In prior art systems, the customer would redeem the card value by calling the phone number and then providing the PIN and account number at IVR prompts. The centralized system may enable the customer to send the PIN in an SMS communication (i.e. text message) to the phone number. For mobile phone customers who send a PIN from their respective mobile phone, the account number (i.e., mobile phone number) need not be provided in the text of the message because it may be identified via an SMS header or caller ID mechanism. For other accounts, the customer may also include an account number in the text of the message. Once the service provider system identifies the PIN and account number based on the SMS message, the PIN's value may be identified and added to the designated account using traditional methods. Thus, a customer may add value to an account by sending a simple SMS text message instead of navigating a two-way phone call.

In some embodiments, the centralized system may send a transaction confirmation back to a user communication device (e.g., a mobile phone that initiated a request to add value), e.g., via SMS. For instance, a confirmation may be sent via SMS to indicate that a request to add value was successfully received. In some embodiments, a confirmation may be sent to indicate that the request was passed to the proper account management system. In some embodiments, a confirmation may be sent to the user's communication device to indicate that the value was successfully added to the customer's account.

In some embodiments, the centralized system may enable the use of an auto-spelling phone dictionary software in mobile phones, such as T9 or Zi, to simplify the process of entering the text of a PIN on a phone keypad. For instance, by using PINs based on real words, the auto-spelling dictionary may auto-complete a word comprised in the PIN. For instance, for a PIN based on the word "kitchen," such as "kitchen123," the phone may auto-complete the word "kitchen" after the user enters the letters "k-i-t-c."

Some embodiments of the present invention relate to payment systems and methods that may allow consumers to make payments at retail locations, e.g., payments for value to be added to a customer account. Some embodiments relate to the use of technical means to facilitate such transactions. While some embodiments relate specifically to payments for crediting an account associated with a device such as a mobile telephone, these and other embodiments may also be more generally applicable to payment for other products and services.

Various embodiments of the present invention may be used in conjunction with existing systems. For instance, value may be added to an account via any embodiment disclosed herein, and value may be added to the same account using conventional systems.

Accordingly, some embodiments of the present invention provide for systems and methods wherein users pass value identifiers (such as a prepaid card PIN) to a central system (or provider system, such as a system of a telecommunications service provider) via short message service (SMS). The SMS message may comprise the PIN (or other identifier).

In some embodiments, the central system may identify the account. For instance, the central system may identify the account if an SMS message is sent from a device that automatically communicates information identifying the account. For instance, the central system may identify a phone number of a mobile phone that sent the SMS message, wherein the phone number is associated with an account. In some embodiments, such as in circumstances where an account cannot otherwise be identified from the SMS communication, the SMS message may also comprise an account number associated with a product or service.

Although many embodiments are described herein in reference to prepaid and post-paid customer accounts, mobile phones, mobile phone accounts, mobile phone service providers, PINs, and prepaid cards, it should be appreciated that the systems and methods described herein may apply to any communication device (e.g., any communication device equipped to send text messages), any account related to a product or service, any provider of a product or service, any identifier associated with a value, and any representation of the identifier (e.g., physical or electronic).

FIG. 1 shows a system for passing an identifier using short message service. As shown in FIG. 1, the system may comprise one or more user communication devices 10a-10b, a central processor 2, one or more provider systems 8a-8b, and one or more merchants 6a-6b. One or more merchants 6a-6b may distribute identifiers (e.g., card having identifiers associated with a value) to one or more customers. For instance, the identifiers may be distributed at a point of sale using a point of sale terminal, e.g., by swiping a magnetic stripe of a stored value card having a printed identifier associated with a value (which in some embodiments may be selected at the point of sale).

The central processor 2 may comprise any computer, server, database system, or other system. The provider systems 8 or central processor 2 may manage customer accounts. Like central processor 2, the provider systems may also comprise any computer, server, database system, or other system.

The user communication device 10 may comprise any device that enables electronic communication (e.g., SMS text messaging) between a user and another entity. For instance, the user communication device 10 may comprise a wireless handset or portable Internet-enabled video game player. The user communication device 10 may be equipped with a keypad and other functionality.

A customer may send an SMS message from a user communication device 10a to one or more other user communication devices 10b or to a central processor 2. The SMS message may comprise a request to add the associated value to a customer account. The request may comprise the identifier as well as account identification information of the customer account (e.g., a phone number corresponding to a telecommunications service account) as well as information identifying the provider of the account (such as the telecommunications service provider).

The user communication devices 10 may also be equipped with software and hardware to enable voice recognition and automatic spelling and dictionary functionality with respect to entering the identifier and/or the identification information into the message. For instance, a user communication device 10 may store a variety of different user account numbers wherein each account number may be entered by pressing a single button (or combination of buttons), without entering the whole account number. In these instances, the phone or other user communication device 10 may store the account numbers so that users do not have to remember them.

Embodiments of the present invention may comprise an alternative payment system and method that involves the use of technical means that may be similar to or different from those described above, e.g., to effect payment for crediting an account.

Some embodiments are directed to a system for crediting an account (such as a mobile phone account) using some or all of the following components:

(a) A mobile phone having a radio communication circuit and a keyboard capable of keying numbers and/or letters of the alphabet and the ability to use the Short Message Service text system provided by a Mobile Operators telecommunications networks (or other centralized system or provider system);

(b) A card purchased from a retail outlet (or over the Internet or other communications network) containing a PIN (or other identifier) comprising alphabetic and/or numeric characters (e.g., and a telephone number for the service);

(c) A transaction control system (or other central system, such as the central system mentioned above) remote from the mobile phone (or other device), the mobile phone and the transaction control system able to communicate using the SMS text messaging facility, the transaction control system storing PIN database records; and (d) A central processing system), the account control system and the transaction control system being remote and being capable of communicating over a communications link, the central processing system storing account database records of customer accounts, each account database record including an amount of payment due (or other value).

Figure 2:
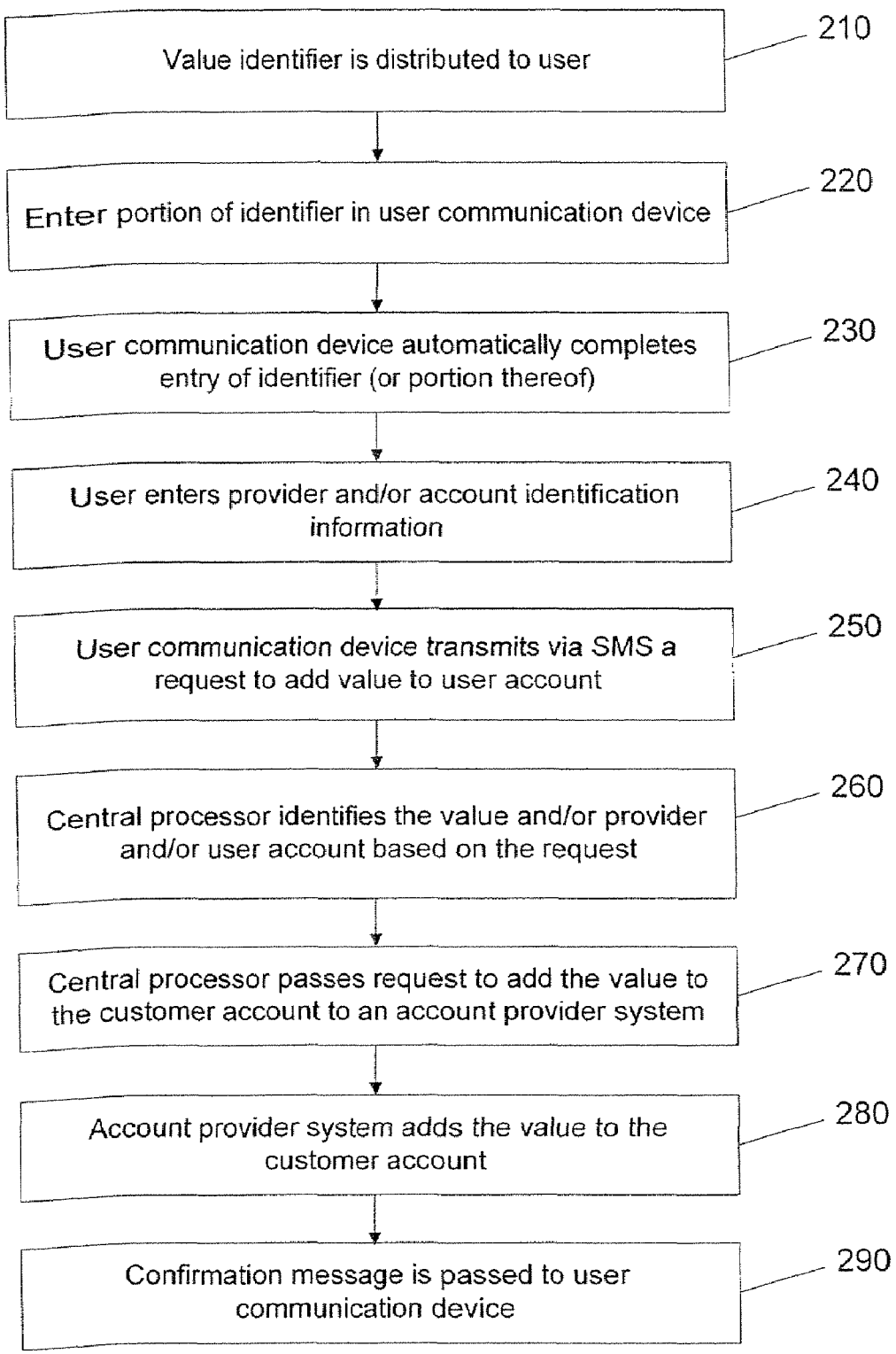
FIG. 2 depicts a flowchart showing a method for passing an identifier using short message service in accordance with some embodiments of the present invention.

FIG. 2 depicts a flowchart showing a method for passing an identifier using short message service. In block 210, a value identifier may be distributed to a user. For instance, the user may purchase a prepaid phone card having a PIN. In some embodiments, the user may purchase an amount of value at a point-of-sale, and the point-of-sale may distribute a coupon or voucher having a PIN or other code representative of the purchase value. In some embodiments, the user may receive the identifier via mail, email, SMS, or other communication (e.g., as a reward for a prior purchase or other activity). Any methods of obtaining an identifier associated with value are contemplated herein. By way of example, a user may purchase a stored value card having an associated value of $50 with the printed PIN "15243CANDLE." For instance, the PIN "15243CANDLE" may be usable to add $50 of value to an account.

In block 220, a portion of the identifier may be entered into a user communication device such as a wireless phone. The identifier (or portion thereof) may be provided to a user communication device as part of an SMS message. For instance, the user may elect to compose an SMS text message and then begin to enter a PIN associated with purchased value. For instance, the user may enter the letters "C-A-N-D" into the keypad of a wireless phone. (It should be appreciated that the number keypad of a phone can be used to enter letters and symbols as well as numbers. For instance, pressing the number "3" two times in rapid succession can be used to enter the letter "E".)

In block 230, the user device may automatically complete the identifier (or portion thereof). For instance, upon entry of the first one or more letters of a PIN or other code (or portion thereof) into a user device, the user device may implement auto-complete functions. For instance, upon entering the letters "C-A-N-D" (e.g., via voice recognition or on a keypad such as a computer keyboard or phone keypad), the user device may automatically complete the word "CANDLE" by automatically entering the remaining letters "L-E." The user may delete the auto-completed letters or otherwise undo the auto-completion by using a backspace, delete function, voice command, or other similar functionality. In some embodiments, the user device may suggest possible auto-completed words that can be selected by the user. For instance, after entry of "C-A-N-D," the user device may suggest the words "CANDY," "CANDIES," and "CANDLE." The user may then select the intended word (here, "CANDLE"). In this way, text entry (e.g., on a phone keypad) can be expedited and simplified.

It should be appreciated that the PIN may be entered in any variety of ways. For instance, the user device may have voice recognition software (or other similar functionality) to recognize and/or identify spoken letters, words, numbers, and symbols (such as the characters of a PIN). For instance, a user may enter a PIN into a user device (e.g., a microphone comprised in the device) by speaking each of the letters, numbers, and symbols of a PIN or other code. The user device may convert each of the spoken characters into text (e.g., text displayed on a screen of the user device.) For instance, if the PIN is "15243CANDLE," then the user may speak each character in series, e.g., "1-5-2-4-3-C-A-N-D-L-E." In some embodiments, voice recognition software may also enable recognition of entire spoken words. Thus, for the above example, the user may speak "1-5-2-4-3-CANDLE," wherein the digits are spoken in succession while the word "candle" is pronounced as a single word. Combinations of spoken and written letters, words, numbers, symbols, and other characters are also contemplated herein. For instance, the user may enter the digits "1-5-2-4-3" on a keypad and then speak the word "candle" or speak each letter "C-A-N-D-L-E." The user might also speak each of the numbers "1-5-2-4-3" and then enter the letters "C-A-N-D-L-E."

In block 240, provider and/or account identification information may be entered into the user device. For instance, the user may speak the name of the company (such as AT&T) that provides a particular service (i.e. telecommunications service) for the user's customer account (i.e. utility, telecommunications, mobile phone, other user device or service. This company or other entity may be the provider of the account to which the user may want to add value. The user may also enter an account number or other account identifier, such as the phone number of the mobile telephone account associated with the customer account. Alternately, another number associated with the account may be provided instead of a phone number, e.g., for accounts that do not involve a phone and for accounts that have an account number separate from the mobile telephone number. For instance, these numbers may be spoken or entered at the user communication device.

In some embodiments, account identification information may be entered (or otherwise provided) automatically or with minimal user input. For instance, the phone number of a user communication device may be automatically transmitted in (or with) any SMS message transmitted from the user communication device, e.g., as source information related to the SMS message. Alternately, the phone number (or other account identifier) may be stored in the user communication device (or on a communications network to which the user communication is connected), and the stored number (or code) may be inserted automatically with a simple click of a button (or combination of buttons). For instance, the user may store a fifteen-digit account number as a speed-dial number in an internal (or networked) database. Instead of entering the entire account number manually for each request to add value to the account, the user may simply speed-dial the number to cause it to be entered into the text message. In some embodiments, the user device may have memory comprising a "phone book" (stored locally on the user device or externally on a communication network or other database or storage). Account numbers, PINs, and other information may be stored in the "phone book" (or other storage system) just like any other number or code. This may enable the user to enter these numbers into the SMS message (or attach them to the message) directly from the phone book without having to manually or verbally enter the individual characters of the account number or PIN, etc.

Mobile telephones and other mobile communication devices may also have m-wallet functionality, which may be used in conjunction with the features and functions described herein. For instance, a user may add credit cards, passwords, and other account identifiers to a database stored on the communication device (or a central processor in communication with the communication device) for use in transactions.

In some embodiments, a customer may enter customer account identification information that is not related to the user communication device. For instance, the customer may enter on an SMS-enabled wireless phone (or personal computer) the number of a bank account, utility account, online merchant account, or other account to which the customer wants to add the value.

It should be appreciated that the SMS message may comprise any other information sufficient to identify the account, such as the name, address, or code associated with a provider of the account (e.g., the name of the bank or utility). This information may be necessary so that the central processor may cause the value associated with the identifier to be added to the proper customer account.

In block 250, the user device may transmit via SMS a request to add the value associated with the identifier to the user account. The SMS message may comprise a PIN, account identification information, and/or account provider identification information. For instance, the SMS message may comprise the inputs entered into the user input device as described in blocks 210-240.

Continuing with the example described above, the SMS message may comprise the PIN "15243CANDLE" and may include the phone number (or other SMS identifier) of the user communication device from which the SMS message originates. For example, the phone number may be comprised in the formatting (e.g., the header) of the message rather than the body of the message. In some embodiments, the PIN, account identifier, and account provider may be identified in the message (e.g., in the body of the message). For example, the message body may comprise a PIN ("15243CANDLE") followed by a phone number (e.g., 2025551234) followed by an account provider (e.g., "AT&T" or a numerical code associated with the provider). The message may conform to predetermined formatting specifications, such as formatting instructions provided on a purchased stored value card. For instance, a single space may separate the PIN from the account identification information in the text message. The request may be passed to a central processor or other entity.

In block 260, the central processor may receive the request. Based on the received SMS message, the central processor may identify the value, account information (e.g., account identification information), and/or provider identification information (e.g., the identity of the provider. For instance, the central processor may identify the PIN from the body of the text, and the central processor may identify the account identification information (such as a phone number) from the header or other formatting information of the SMS message.

The central processor may identify a value associated with the identifier by looking up the identifier in a database of identifiers, each associated with a value. For instance, in the case of stored value cards with a predetermined value that are distributed to customers, each PIN identifier printed on a card may be associated with a specific predetermined value prior to distributing the cards. In other embodiments, the customer may assign a selectable value to a particular PIN. For instance, a particular PIN or card number may be assigned a value selected by the customer at the time the customer purchases the value. In those embodiments, the value may be associated with the specific value at the point of sale and stored in a database operatively connected to the central processor. The central processor may accordingly process information in the database to determine the value that corresponds to the identified PIN or other code.

In some embodiments, the central processor may also identify account identification information, such as a phone number of the requesting user communication device. In some embodiments, the central processor may process the body or formatting information to determine the account identification information. Like the PIN and value information, account information may be stored in and retrieved from a database. For instance, an account database may associate each of a plurality of user accounts with account identification information (such as a phone number of a user communication device).

In some embodiments, the central processing system may manage the customer account for which value is requested to be added. In these embodiments, the central processor may cause the value to be added to the account, e.g., by amending a database entry corresponding to the account.

In block 270, the central processor may pass to a provider system a request to add the value to the customer account. For instance, if the customer's account is managed by a third-party account provider (e.g., a carrier of telecommunications service or a public utility), then the request may be passed to this entity so that it can add the value to the account. The request may comprise any request as described or referenced herein. For instance, the request may comprise a request to "insert value" into the customer's account, as described in one of the applications incorporated by reference. It should be understood that the actions described for block 270 may be unnecessary if the central processor manages the customer's account.

In block 280, the account provider system may add the value to the customer account. Again, it should be noted that the account provider may be the same or different entity than the central processor.

In block 290, a confirmation message may be passed to the originating user communication device. For instance, if a user communication device originates the request to add value, then a confirmation may be passed to this device, e.g., via SMS. Any type of confirmation may be passed. For instance, a confirmation of any of the following may be passed to the user device or otherwise communicated to the user: a confirmation that the request was received; a confirmation of the amount of value requested; a confirmation that the request was passed to the relevant provider; a confirmation that the value was successfully added to the account; an updated account balance; and other confirmation information. It should also be appreciated that the request process may comprise one or more verification steps. For instance, upon receiving a request to add value, the central processor may send a reply SMS message identifying the account (or the name of the requester or other information associated with the request) and requesting confirmation to proceed with the transaction (e.g., by pressing "OK" on a phone keypad, and/or sending a reply SMS message containing the number "1" or another code indicating confirmation).

Various modifications and deviations from the method described herein are also within the purview of the invention. For instance, it should be appreciated that the identifier may be distributed to one customer but then received from another customer. For instance, the identifier may be distributed to one customer, who then gives it (e.g., transmits it via SMS) to another customer. The second customer may then request to add the value to an account of the second customer (or a third customer). The identifier may be passed to any number of different users before it is redeemed.

It should also be appreciated that the request to add value may be received from a person different from the holder of the target account. For instance, a parent may purchase value and send an SMS message requesting to add value to a child's (or friend's) account. In some embodiments, a request to add value may be processed regardless of the source of the request as long as the identifier and account identification information correspond to valid value identifiers and customer accounts.

Other methods of implementing various embodiments of the invention may comprise some or all of the following actions:

(a) Keying in the alphabetic PIN (or other identifier) from a purchased card (or other physical or virtual representation of a value identifier) onto the mobile phone (or other communication device) using the keyboard (or input device) of the mobile phone (or other device);

- (b) Sending this alphabetic PIN as an SMS text message to the phone number for the product or service as specified on the card (or other representation of a value identifier);
- (c) The data read by the transaction control system corresponding to a PIN record in the database;
- (d) The transaction control system communicating with the account control system and requesting of it to update the customers account by the amount provided by the customer (or other value associated with the identifier);
- (e) Returning an SMS text message to the mobile phone confirming the success or otherwise of the bill pay (or other transaction wherein value is added or otherwise credited to an account).

Various features of the present invention as applied to crediting an account for a mobile phone may be generalized to any other products or services. For instance, instead of maintaining and updating account database records, appropriate means for delivering the product or service in question are provided. The manner of delivery will depend on the product in question, but includes generating an order for a supplier to supply a product, communication of data to instruct a service provider to provide a service, or where a product is intangible and represented by database records, updating that database record. In order for a consumer to invoke the purchase of products or services other than an airtime credit, the alphanumeric code of the product or service may be included in the SMS short message as well as the PIN of the card purchased.

According to another aspect of some embodiments of the invention, systems and methods of purchasing general services may be provided. These systems and methods may involve any or all of the following:

- (a) A mobile phone having a radio communication circuit, a keyboard capable of keying numbers and letters of the alphabet and the ability to use the Short Message Service text system provided by the Mobile Operator telecommunications networks;
- (b) A card purchased from a retail outlet containing a PIN comprising alphabetic characters only and a telephone number for the service;
- (c) A transaction control system remote from the mobile phone, the mobile phone and the transaction control system able to communicate using the SMS text messaging facility, the transaction control system storing PIN database records wherein each PIN has a related denomination stored against it; and
- (d) A service fulfillment account control system run by a service fulfillment company, the service fulfillment account control system and the transaction control system being remote and being capable of communicating over a communications link, the service fulfillment control system storing details of products and services in a common database or databases and each product or service has a value recorded against it in its database record.

Any methods may be used, such as those involving any or all of the following:

- (a) Keying in a variable length alphanumeric product or service identifier and the alphabetic PIN from the card onto the mobile phone using the keyboard of the mobile phone;
- (b) Sending this identifier and alphabetic PIN as an SMS text message to the phone number for the service as specified on the card;
- (c) The data read by the transaction control system corresponding to a PIN record in the database;
- (d) Communicating the product or service identifier from the data read and the PIN and the consumer's mobile phone number to the service fulfillment account control system;
- (e) The data read by the service fulfillment account control system corresponds to a record in the service fulfillment account control system's database and this record identifies the product or service being requested and its value;
- (f) Beginning the process of fulfilling the order identified from the read data by delivering the product or service to the consumer identified by their mobile phone number;
- (g) Confirming back to the transaction control system that the transaction has been successful; and
- (h) Returning a confirmation SMS text message to the mobile phone.

When applied to payments for products in general, some embodiments of the present invention may provide the same advantages as described above with reference to bill pay via SMS. The present invention is particularly useful in that it provides a mechanism of allowing consumers to pay for a product or service at any of a large number of retail locations, but without the retailer needing to be involved in the delivery of the product. For instance, instead of delivering a product (or service) at a point-of-sale (POS), a merchant may merely deliver a PIN associated with the product or service (e.g., by delivering a virtual or physical representation of the PIN, such as a card). For instance, the customer may purchase a card comprising the PIN. The customer may later contact a central entity in order to redeem the product or service.

The method of payment at the retailer by the consumer for the card that contains the PIN may be by any accepted means supported by the retailer. The cards may appear as any other product to the retailer. Each card may have a unique number (e.g., a European Article Number, serial number, barcode, number encoded on a magnetic stripe). For instance, the number may be presented as a barcode exactly as all other products for sale. This barcode may be read by the retailer's terminal equipment and the correct payment amount may be indicated and requested.

According to another aspect of some embodiments of the invention, there is provided a mechanism whereby the PIN, which for paying the customer's account (e.g., airtime account) alone may have a specific value and may be communicated between consumers using any or all of the following, for example:

- (a) A first mobile phone having a radio communication circuit, a keyboard capable of keying numbers and letters of the alphabet and the ability to use the Short Message Service text system provided by a Mobile Operator telecommunications networks;
- (b) A card purchased from a retail outlet containing a PIN comprising alphabetic characters only and a telephone number for the service; and
- (c) A second mobile phone having a radio communication circuit, a keyboard capable of keying numbers and letters of the alphabet and the ability to use the Short Message Service text system provided by a Mobile Operator telecommunications networks.

Any methods may be used, such as methods involving any or all of the following:

- (a) Keying in the alphabetic PIN from the card onto the first mobile phone using the keyboard of the mobile phone;
- (b) Sending this alphabetic PIN as an SMS text message to the second mobile phone;

(c) The second mobile phone sending this same alphabetic PIN as an SMS text message to the phone number for the service as specified on the card;

(d) The data read by the transaction control system corresponding to a PIN record in the database;

(e) The transaction control system communicating with the account control system and requesting of it to update the customer account of the second mobile phone user by the amount identified in the SMS text message;

(f) Returning a confirmation SMS text message to the mobile phone.

The various features of the present invention as applied in the third aspect above to crediting an account for a mobile phone may be generalized to any other products as described above.

According to another aspect of the present invention, there is provided a mechanism whereby the PIN on a card purchased from a retailer may be used in the purchase of goods and services through the web, or via other routes which may otherwise involve the use of credit or debit cards or other payment mechanisms that imply that the consumer has a bank or equivalent account. In some embodiments, the PIN may first be converted into a standard transaction card identifier, such as a Visa card number. For example, a customer may access a website (e.g., a website identified on the card or a website of the merchant who sold the card) and enter the PIN. The website may receive the PIN, identify the value, purchase a stored value card for a corresponding value, and then send the card number (and other authorization information) to the customer, e.g., via the website or in an email. In another embodiment, e-tailers may employ special payment functionality so that PINs can be used in place of credit cards and other traditional payment methods.

Some embodiments of the invention may comprise any of the following:

(a) A mobile phone having a radio communication circuit, a keyboard capable of keying numbers and letters of the alphabet and the ability to use the Short Message Service text system provided by a Mobile Operator telecommunications networks;

(b) A card purchased from a retail outlet containing a PIN and a telephone number for the service;

(c) A transaction control system remote from the mobile phone, the mobile phone and the transaction control system able to communicate using the SMS text messaging facility, the transaction control system storing PIN database records wherein each PIN record has a denomination stored in it; and (d) An account control system, the account control system and the transaction control system being remote and being capable of communicating over a communications link, the account control system storing account database records of customer accounts, each account database record including a bill pay amount.

Some embodiments may comprise any of the following:

(a) Purchasing a card from a retailer and using the retailer's system to accept payment as for other goods;

(b) Keying in the PIN from this purchased card onto the mobile phone using the keyboard of the mobile phone;

(c) Sending this PIN as an SMS text message to the phone number for the service as specified on the card;

(d) The data read by the transaction control system corresponding to a PIN record in the database and from this record extracting the denomination of the card;

(e) The transaction control system communicating with the e account control system and requesting of it to update the customer's account by the amount identified by the PIN; and (f) Returning a confirmation SMS text message to the mobile phone.

The entry of PINs may be simplified by using a wholly alphabetic PIN. Such a PIN may be less than the length of the equivalent numeric PIN (e.g., less than half the length) and yet have the same number of possible values, since there are 26 letters and only 10 digits. In some embodiments, PIN entry may be simplified by using PINs made of words from the T9 dictionary (or other dictionaries such as auto-spelling dictionaries). The PIN on the card may be constructed wholly from one or more words found in an automatic word spelling dictionary present in mobile phones or other communication devices. This then simplifies the keying in of PINs by using such dictionaries as T9 and Zi. According to some embodiments, IVR and voice recognition may be used for systems for PIN input on voice calls. The alphabetic or word based PIN may be provided to the system by the customer talking into the system by means of a voice recognition system based on an Interactive Voice Response service.

In some embodiments, one user may send text to one another (via SMS) and thereby electronically transfer card values to one another. For instance, a user may send a prepaid card PIN to another user (such as a family member or friend). The other user may use the PIN to obtain the associated product or service.

According to some embodiments, a user may key in a card PIN onto a mobile phone using the keyboard of the mobile phone and send this PIN by SMS text message to another mobile phone. The recipient may then send this SMS text message on to yet another mobile phone. This process may repeat any number of times. The final recipient mobile phone may send the PIN as an SMS text message to the central system (e.g., a central phone number) for the service as specified on the card. The value of the cards may be controlled or monitored by batch or POS activation. For instance, whenever cards are swiped at a retail location, a central processing entity may activate the card.

Some embodiments may include any or all of the following:

(a) A mobile phone having a radio communication circuit, a keyboard capable of keying numbers and letters of the alphabet and the ability to use the Short Message Service text system provided by the Mobile Operator telecommunications networks;

(b) A transaction control system remote from the mobile phone, the mobile phone and the transaction control system able to communicate using the SMS text messaging facility, the transaction control system storing PIN database records wherein each PIN record has a denomination stored in it;

(c) Combining known cards into batches of one or more card;

(d) Identifying these batches of cards by unique batch identifiers and recording these batches in a database forming a part of the transaction control system whose records contain a status identifier for each of these batches;

(e) Recording all the PINs of all the cards contained in the batch in the batch database record;

(f) Issuing these batches of cards to retailers with a status of "inactive" wherein every card is therefore inactive; and (g) Activating one batch at a time by the retailer communicating with the transaction control system, identifying the batch by means of its unique batch identifier and requesting that the status be changed to "active" wherein every card in the batch becomes active; a process termed "activation".

Some embodiments may comprise any or all of the following:

(a) Purchasing a card from a retailer and using the retailer's system to accept payment as for other goods;

(b) Keying in the PIN from this purchased card onto the mobile phone using the keyboard of the mobile phone;

(c) Sending this PIN as an SMS text message to the phone number for the service as specified on the card;

(d) The data read by the transaction control system corresponding to a PIN record in the database and from this record extracting the denomination and the status of the card;

(e) Returning a rejection SMS text message to the mobile phone if the status of the card is found to be inactive;

(f) The transaction control system communicating with the airtime account control system and requesting of it to update the mobile phone's account by the amount identified by the PIN if the status of the card is found to be active; and (g) Returning a confirmation SMS text message to the mobile phone.

In some embodiments, the value may determined by the amount paid for it by the customer. For instance, the customer may specify a certain value to be activated on the card, according to any systems and methods known in the art.

The retailer may be charged for the value of the cards following activation. Some embodiments of the invention may provide a card based for a specified bill pay service that may not need any PINs provided by the Mobile Operators. In some embodiments, an IVR may not be needed for adding PIN value to an account. In some embodiments, a card purchased for a specified bill pay can be used equally by account holders of any Mobile Operator (or other product or service provider). In some embodiments, entities (such as third parties) may place advertising on the cards (or other representation of an identifier). In some embodiments, PINs may be used as payment for goods and services. For instance, the PIN may be used as a card number in a transaction similar to that used for credit and debit cards at merchant terminals or over the Internet.

The application of air-time credit to a mobile phone may be achieved by the end-user sending a free standard text message of a service identifier (typically 5 characters) and an 8 character alphabetic PIN to an SMS host; a process with which the vast majority of Pre-Pay users are very familiar, and whose success rate may be significantly higher than IVR.

In some embodiments the absence of the service identifier may indicate that the value is to be added to the user's airtime account. In some embodiments the user may determine the functionality of one or more service identifiers. Card PINs may be provided by a centralized system. The end-user may send one or more PINs to the centralized system, which may construct from an interpretation of the text an electronic bill pay to the end-user's mobile operator.

One benefit of the present invention is that providers of products and services (such as those that may be associated with a PIN) may use electronic distribution and redemption channels that do not necessarily involve the distribution to a consumer (or reception from a consumer) of a physical embodiment of a PIN (e.g., on a physical card). For instance, a bill pay may be entirely electronic.

Cards and accounts may be activated in a variety of ways: in units of a batch at the point of sale by using an IVR (or web) based activation service; or in units of a card, again at the point of sale, but by swiping the card through the acquisition or POS terminal. Value associated with identifiers may also be activated and/or credited in any other ways known in the art, such as any of those described in the following U.S. Patents and Patent Applications: U.S. application Ser. No. 10/778,338 filed Feb. 17, 2004, U.S. application Ser. No. 10/253,243 filed Sep. 24, 2002, U.S. Provisional Application No. 60/324,333 filed Sep. 24, 2001, U.S. Provisional Application No. 60/396,404 filed Jul. 15, 2002, U.S. Provisional Application No. 60/519,630 filed on Nov. 14, 2003, U.S. Provisional Application No. 60/519,629 filed on Nov. 14, 2003, U.S. application Ser. No. 10/712,182 filed Nov. 13, 2003, U.S. application Ser. No. 10/655,828 filed Sep. 5, 2003, U.S. patent application Ser. No. 10/698,084 filed Nov. 3, 2003, U.S. application Ser. No. 10/411,971 filed Apr. 11, 2003, U.S. application Ser. No. 09/641,363 filed Aug. 18, 2000 (now issued as U.S. Pat. No. 6,575,361), U.S. Provisional Application No. 60/149,740 filed Aug. 19, 1999, U.S. application Ser. No. 10/732,641 filed Dec. 10, 2003, the U.S. Application filed Dec. 19, 2003, and the U.S. Patent Application filed Jan. 16, 2004. All of these patents and applications are incorporated herein by reference in their entirety. Other features of these patents and applications are also contemplated herein. It should be appreciated that the authorization and activation of media devices as described herein may be combined with the novel systems and methods of the applications referenced above.

It should be appreciated that the embodiments described above may have some or all of the features described for that embodiments. For each system component or step described above, a corresponding system and method according to the invention may comprise only a portion of the component or step. In some embodiments, the cards may only have value following activation offering the industry very significant control benefits and minimizing financial risk to the retailer. In some embodiments, the cards may only be charged after activation, offering much improved cost controls over existing services. In some embodiments, the operators can significantly reduce or even close their IVR services. In some embodiments, the operators can significantly reduce their Customer Services support provision. In some embodiments, the nature of the service also enables a single generic card to be used for all networks, ensuring availability of stock and providing greater flexibility in card use.

According to some embodiments, a customer may designate a service provider. A small number of cards, e.g., 3 cards with denominations of $5, $10, $20, could be in circulation instead of a larger number of cards for each denomination for a plurality of different service providers. A customer may purchase a single card and later select the service provider (or select the service provider at the point of sale).

It should be understood that the identifiers may be used, unchanged and with the same end-user interface, to purchase other services such as mobile services (text bundles, ringtones, screen savers, games and so on) and non-mobile services (WiFi time, web purchases, lottery tickets, etc). As contemplated herein, the identifiers may be used to add or activate any type of value in any type of customer account. For instance, any of the products and/or services mentioned in commonly-owned U.S. application Ser. No. 10/732,641 filed Dec. 10, 2003, are contemplated herein. The disclosure of this application is incorporated herein by reference in its entirety.

In some embodiments, one or more cards and identifiers may be transferable as gifts. For instance, an identifier may be passed from one user device to another user's device. The transferee may then use the identifier to redeem value in the same or similar manner as that described herein.

In some embodiments, the identifiers may be service-independent such that the PIN may be used in other financial transactions. In some embodiments, identifiers may be used with any network, such as a closed or open debit or credit network.

In some embodiments, because the manufacture and distribution of cards may be outside the control of the mobile operators, additional branding and marketing opportunities are possible. For example cards themed for Christmas and other occasions, special editions, prizes and so on, or Starbucks or McDonald's branded cards become a possibility. Cards may be branded with an entity other than (or in addition to) the provider of the card.

Using text as the mechanism for transferring the PIN to the airtime service. In some embodiments, "own label" PINs can be used to remove the need for anything of value from the Mobile Operators in the whole process. In some embodiments, Mobile Operators may be unaware of a voucher until the bill pay occurs.

Some PINs/identifiers may redeemable for the purchase of age-related goods and services (such as lotteries, and goods/services related to younger children such as entry to theme parks, etc.). Adult content may also be purchased. Merchants may perform any necessary age checking at the point of purchase. Redemption of these clearly marked PINs would be restricted according to their intended use.

Figure 3:
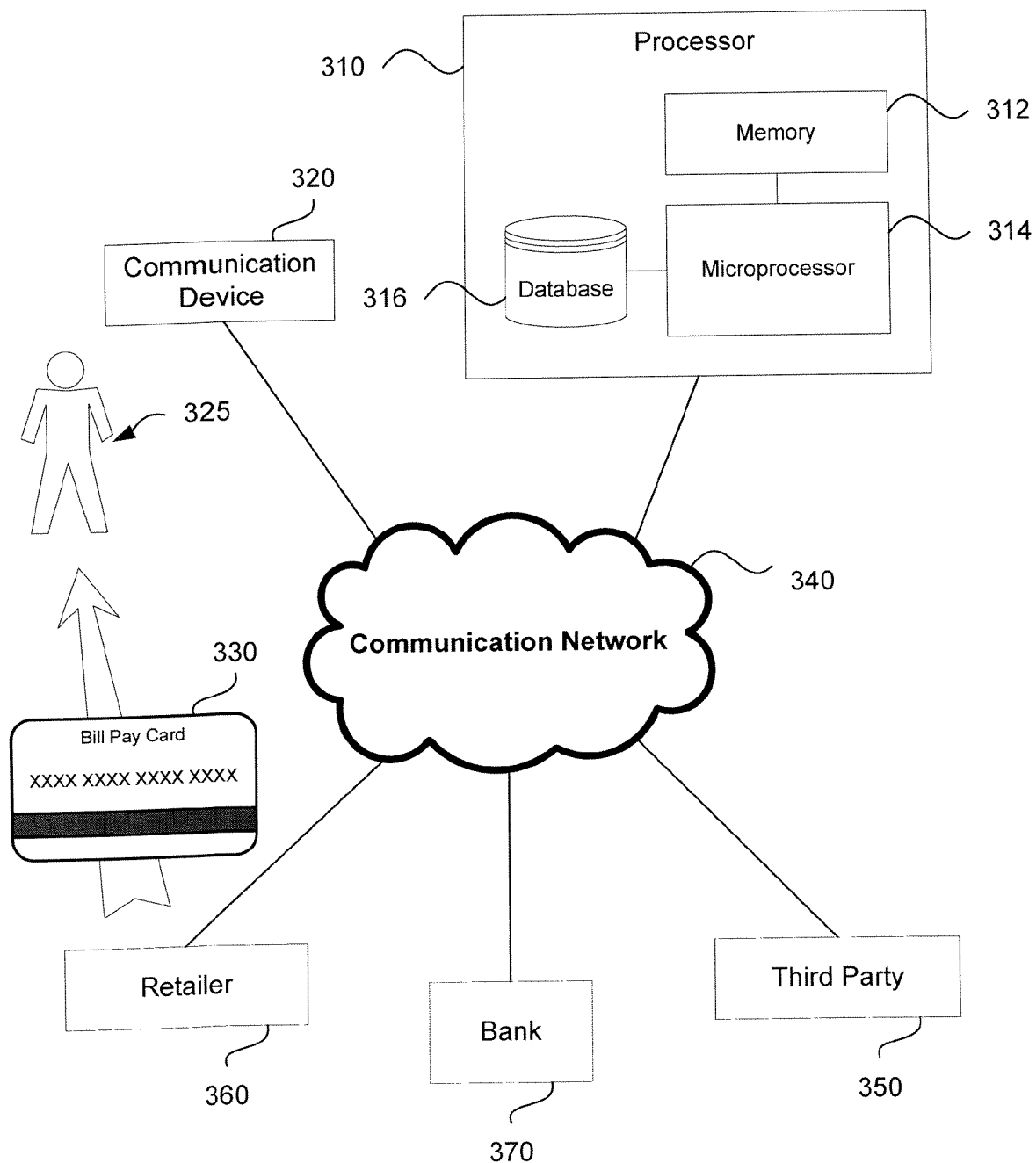
FIG. 3 is a diagram of a payment system that utilizes SMS communications in accordance with some embodiments of the invention.

With reference to FIG. 3, a bill payment system 300 may comprise a bill payment card 330, a processor 310, a user 325, a third party 350, a communication device 320, and a communication network 340. In some embodiments of the invention, a user 325 may obtain and associate value with a bill payment card 330, communicate information to and from the processor 310 over a communication network 340 via short messaging services (SMS) using a communication device 320, and direct the processor 310 to transfer value associated with the bill payment card 330 to a third party 350.

In some embodiments, the bill payment system 300 may comprise a retailer 360, where a user 325 may purchase a bill payment card 330. Further, the bill payment card system 300 may comprise a bank 370 that manages financial accounts associated with the bill payment card 330 and/or the third party 350. The bill payment card 330 may not contain any actual value. Instead, value may be in an account associated with the bill payment card 330. For simplicity of discussion, however, transactions discussed below may refer to value "on" or transferred "to" or "from" a bill payment card 330. Such value transactions are to be understood to include "to," "from," or "on" an account associated with the bill payment card 330.

The bill payment card 330 may be of any physical shape and configuration, and also may comprise any type of material. In some embodiments of the invention, the bill payment card 330 may be configured the same or similar to a standard credit or debit card, made of plastic and having the same or similar proportions and features. In some embodiments of the invention, the bill payment card 330 may be card-like, but have different proportions than a standard credit or debit card, e.g., a keychain card, a folding paper card, a metal card, and so forth. In addition, the bill payment card 330 may be non-card-like, e.g., a key fob, miniature figure, and/or a communication device, etc.

The bill payment card 330 may have identification indicia, such as, by way of example only, alpha characters, numeric characters, alphanumeric characters, images, embossed numbers, a coded magnetic strip, an embedded electronic chip, bar codes, and/or other such identification indicia as known in the art. In some embodiments of the invention, there may be unique identification indicia for each bill payment card 330. Alternatively, some or all of the bill payment cards 330 may include the same identification indicia, or there may be a group of bill payment cards 330 with the same identification indicia within the group, but with a different indicia from other groups.

The identification indicia may be configured to associate the bill payment card 330 with a user 325, a third party 350, a processor 310, a retailer 360, and/or some other entity. The association may be accomplished by memory located remote of the bill payment card 330 or may be located on the bill payment card 330 itself. For example, information about the bill payment card 330 and/or the user may be stored in a remote database and/or may be embedded in a magnetic stripe on the bill payment card 330. In addition, the bill payment card 330 may be associated with a particular third party 350 using indicia that is visible on the card, such as, by way of example only, a biller-specific telephone number and/or trademark.

The bill payment system 300 may be configured to have one and/or multiple users 325 for each bill payment card 330. In some embodiments of the invention, the bill payment system 300 may be configured to be user independent, i.e., configured in such a way that anyone in possession of the card may use and have access to the available value on the bill payment card 330. In some embodiments of the invention, the bill payment card system 300 may be configured such that a single user or a limited number of users 325 may be authorized to use each bill payment card 330. For example, a user 325 purchasing a bill payment card 330 may be automatically authorized to use the bill payment card 330, and the user 325 may also select additional authorized users 325, who are then associated with the same bill payment card. Additional users 325 may be associated with a special bill payment card 330 by a processor 310 by adding additional user information to a record in a database 316. Alternatively, additional users may be associated on the bill payment card 330 itself, such as in memory located on the bill payment card 330.

A user 325 may utilize a bill payment system 300 by communicating with a processor 310 over a communication network 340 via SMS. The communication network 340 may be any type of network that allows a user 325 to communicate with a processor 310 via short messaging services (SMS). The communication network 340 may be an electronic network, e.g., a public switched telephone network (PSTN), the Internet, an automated teller machine (ATM) network, any other type of public or private network, and/or any type of wireless network, and so forth. In some embodiments of the invention, the communication network 340 may be a non-electronic network, e.g., the postal service.

As noted above, a user 325 may communicate over the communication network 340 via SMS using a communication device 320. The communication device 320 may be any device that enables such communication. For example, the communication device 320 may be a telephone, wireless or cellular telephone, computer, POS, Internet device, e-mail device, and/or text messaging device, etc. The communication device 320 may be located at a fixed location, such as a POS at a retail location, or may be mobile, such as a cellular telephone.

The bill payment system 300 may be adapted for transferring value associated with the bill payment card 330 to a single third party or multiple third parties 350. In some embodiments of the invention, the bill payment card 330 may be pre-associated with a single third party 350. For example, the bill payment card 330 may include visible indicia on the face of the bill payment card 320 that indicates the associated third party 350, such as the third party's trademark. The bill payment system 300 may also be adapted for transferring value to multiple third parties 350.

A third party 350 may include any person or entity that may receive value transferred from the bill payment card 330. For example, a third party 350 may be a biller to whom payment is owed. The third party 350 may also be a retailer or provider of goods and services from which the user wishes to make a purchase. The third party 350 may also be the user 325 himself or herself, which may allow the user 325 to disburse value from the bill payment card 330 to himself or herself. For example, a user 325 may associate a cash value with the bill payment card 330 and then designate himself or herself as the third party 350 in order to receive a cash disbursement from the bill payment system 300.

A processor 310 may be configured to manage the bill payment system 300. The processor 310 may include a microprocessor 314, memory 312, and a database 316 to perform some or all of the functions of the bill payment system 300 electronically.

In some of the embodiments of the invention, a retailer 360 may perform none, one, or more of the functions of a bill payment system 300. These functions may include those functions listed above regarding the processor 310. The retailer 360 may also perform other functions, e.g., selling a bill payment card 330 to a user 325; receiving value from a user 325; providing a receipt to the user; etc.

For example, the retailer 360 may be configured to make a bill payment card 330 available to a user 325, such as through an off-the-shelf purchase or by the user 325 operating a self-service kiosk or machine. The retailer 360 may be configured to receive bill payment cards 330 from a processor 310 and/or a third party 350 and to communicate with the processor 330 and/or a third party 350 before, during, and/or after a bill payment card purchase.

The processor 310 and/or third party 350 may be configured to receive a communication from the retailer 360 before, during, and/or after a sale of a bill payment card 330 to a user 325. During a sales transaction, the retailer 360 may communicate with the processor 310, transmitting information about a user 325 and the sale, and receiving information and/or authorization about the bill payment card 330 and any other associated information, e.g., biller information. Alternatively, the retailer 360 may be configured to perform the sales transaction with the user 325, and subsequently communicate with the processor 310 and/or third party 350. None, some, or all of the transactions performed by the retailer may be performed in this "off-line" manner, where communication between the retailer 360, the processor 310 and/or third party 350 takes place at a time subsequent to a purchase or transaction.

Figure 4:
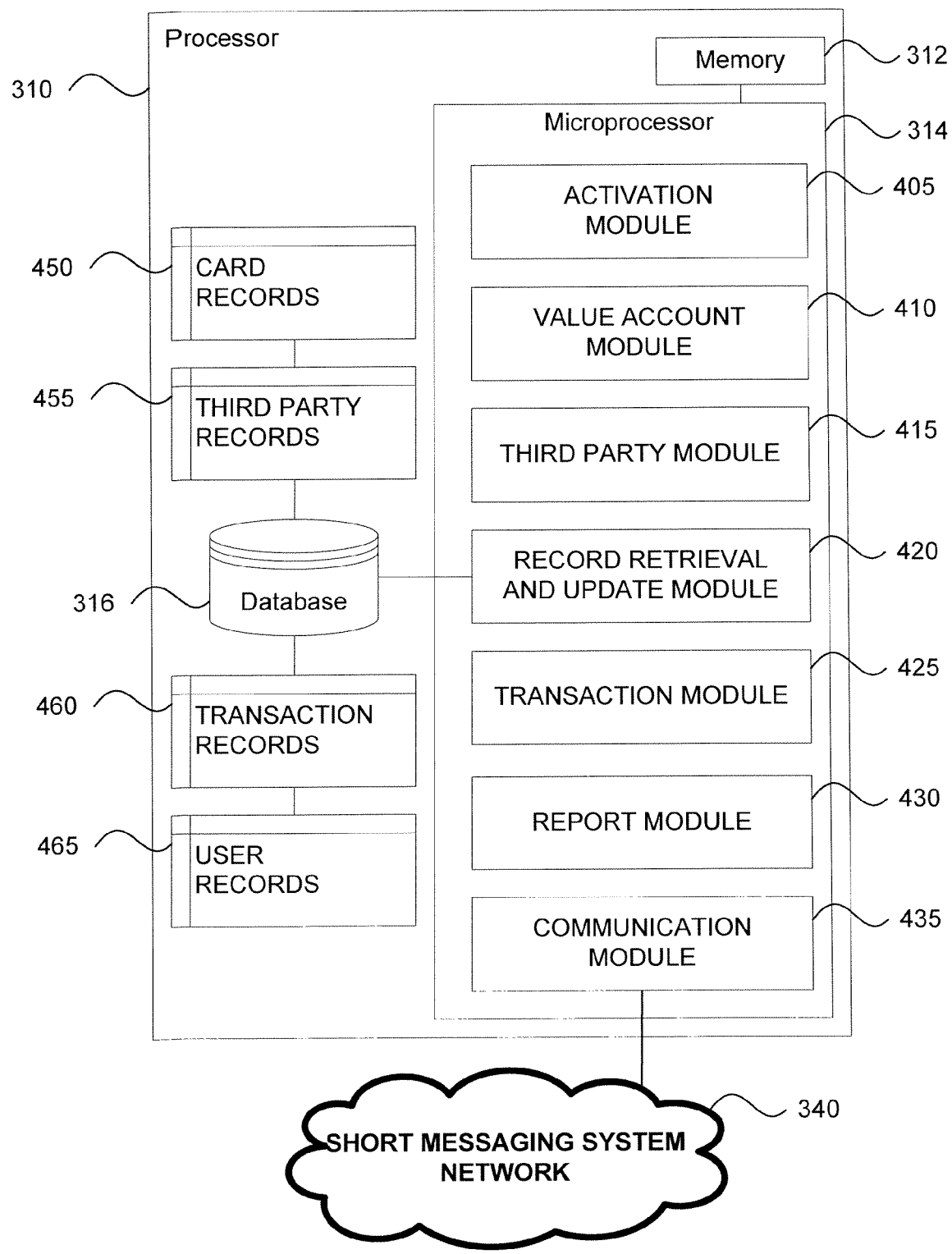
FIG. 4 is a diagram of a processor configured to manage a payment system in accordance with some embodiments of the invention.

With reference to FIG. 4, the processor 310 will now be discussed. The processor 310 may comprise a microprocessor 314, memory 312, and a database 316. The processor 310 may include several modules that are configured to perform some or all of the functions of managing a bill payment system 300, including an activation module 405, a value account module 410, a third party module 415, a record module 420, a transaction module 425, a report module 430, and a communication module 435.

The processor 310 may include a communication module 435 to communicate with users, retailers, third parties, and/or financial institutions. The communication module 435 may be configured to communicate via SMS communications over one or more networks, e.g., a PSTN, the Internet, an ATM network, and/or any type of wireless network.

In some embodiments of the invention, the communication module 435 may be configured such that a user 325 may communicate with the processor 310 to perform a transaction over the Internet, e.g., using a web browser, e-mail, text messaging, short messaging service (SMS), and/or instant messaging. The communication module 435 may be configured to receive information from the user 325, such as a payment amount and/or third party information, and to transmit information to the user 325, such as fund balance information, low balance information, a receipt, and/or a transaction history.

The processor 310 may also be configured to include a database 316 to store records and information related to a bill payment system 300, e.g., bill payment card records 450, third party records 455, transaction records 460, and/or user records 465. The database 316 may include any type of record that may be associated with a bill payment card 330, for example, bill payment card records 450, third party records 455, transaction records 460, and/or user records 465. The modules and records in FIG. 4 are for illustrative purposes only, and thus, additional or fewer modules and records, and other configurations are contemplated by the present invention to carry out the methods and systems described herein.

Each record in the database may comprise any information related to the bill payment system 300, e.g., a unique identifier (bill payment card number, password, etc.), user information (e.g., name, address, user number, authorized user list, third party account information, bank account information, etc.), third party information (e.g., name, address, telephone number, SMS, mobile number, customer account information, bank account information, etc.), retailer information (e.g., name, address, retailer number, etc.), and transaction history (e.g., for user, retailer, and/or biller, etc.). For example, in some embodiments of the invention, the processor 310 may be configured to associate bill payment cards 330 and/or users 325 of the bill payment cards 330 with a third party or third parties 350 by creating a record that includes a unique identifier located on a bill payment card 330 along with the user's name and address and third party account information.

The processor 310 may further comprise an activation module 405 configured to perform the function of activating a bill payment card 330. The activation module 405 may be configured to request and receive a unique identifier associated with the bill payment card 330. The activation module 405 may also be configured to create and store a bill payment card record 450 associated with the unique identifier. The bill payment card record 450 may be modified in any fashion to indicate activation of the bill payment card 330. Alternatively, creation of the bill payment card record 450 by itself may indicate activation of the bill payment card 330, without any further modification.

The processor 310 may further comprise a value account module 410, configured to manage a value account associated with a bill payment card 330. The value account module 410 may be configured to transfer value from a user to an account, or from an account to a user or a third party. For example, the value account module 410 may communicate with a bank 370 to transfer funds into or remove funds from a financial account. In some embodiments of the invention, the processor 310 may locate value associated with the bill payment card 330 in an account, until the user 325 initiates a transfer of payment, after which, the value account module 410 may direct a transfer of an amount of value indicated by the user 325 from the account to a third party 350. The value may be transferred in any fashion, such as, by way of example only, wire transfer, electronic transfer, mail or courier, etc. The processor 310 may transfer the value to a third party 350 immediately or may transfer the value periodically, such as monthly. The processor 310 may also collect multiple payments of value from multiple users 325 throughout a specified period and make a single payment to the third party 350 at the end of the specified period.

The processor 310 may further comprise a third party module 415 configured to perform functions related to third parties 350 that are associated with the bill payment system 300. For example, the third party module 415 may be configured to request and receive third party information, which the third party module 415 may associate with a bill payment card 330. The third party module 415 may perform other functions, including registering third parties 350 with the bill payment system 300 and managing third party information, e.g., customer account numbers, balance information related to customer accounts, payment due dates, etc.

The processor 310 may further comprise a record module 420, that may be configured to store, modify, and retrieve records from the database 316. The record module 420 may be configured to store any type of information related to the bill payment system 300, e.g., user information, third-party information, card information, transaction information, retailer information, etc. The record module 420 may access and modify records in the database 316 in real-time during each transaction or in an offline mode, where the database is updated subsequent to each transaction.

A transaction module 425 configured to manage any or all aspects of transactions involving a bill payment system 300 may also be included in the processor 310. Transaction related functions may include, but are not limited to, requesting and receiving a unique identifier, retrieving a bill payment card record associated with a unique identifier, requesting and receiving a third party selection, determining an amount owed to a third party 350, sending an indication of a balance associated with a bill payment card 330, requesting and receiving an amount to pay, requesting and receiving payment verification, initiating a transfer of value to a third party 350, creating and updating records 450, 455, 460, 465, issuing a receipt, and requesting and receiving an indication of whether a user chooses to perform an additional transaction.

The transaction module 425 may be configured to also authorize use of a bill payment card 425. In some embodiments of the invention, the processor 310 may store a password, or some user-specified code word and/or number, which the processor 310 may compare to a password and/or code entered by a user 325 when initiating a transaction. The password may be some or all of a unique identifier associated with a bill payment card 330.

The processor 310 may comprise a report module 430 that is configured to produce reports based on information related to a bill payment system 300. These reports may be accessed on demand, such as via SMS or by using the Internet and/or telephone, or the reports may be distributed on a periodic basis, such as by mail or postal service and/or by e-mail. The report module 430 may be configured to issue reports to users 325, retailers 360, third parties 350, and/or other entities related to the bill payment system 300. For example, the processor 310 may issue a quarterly report to each third party 350 associated with the bill payment system 300. In another example, the processor 310 may issue monthly reports to users 325 of the bill payment system 300. The processor 310 may also be configured to issue a report, confirmation, receipt, etc. after each use of the bill payment system 300. For example, the processor 310 may be configured to send via SMS or e-mail a confirmation after each transaction involving a bill payment system 300. The frequency and content of these reports may be selected by the entity receiving the report. For example, a user 325 may select to receive monthly reports in the mail, quarterly reports by e-mail, receipts via e-mail immediately after each transfer, and/or some combination of reports, such as an immediate receipt via e-mail and a monthly report in the mail.

The processor 310 may or may not also be a third party 350 or a component of a third party system. For example, a user 325 may obtain a bill payment card 330 from a third party 350. The user 325 may later communicate with the third party 350 in order to transfer value from the bill payment card 330 to the third party 350.

Figure 5:
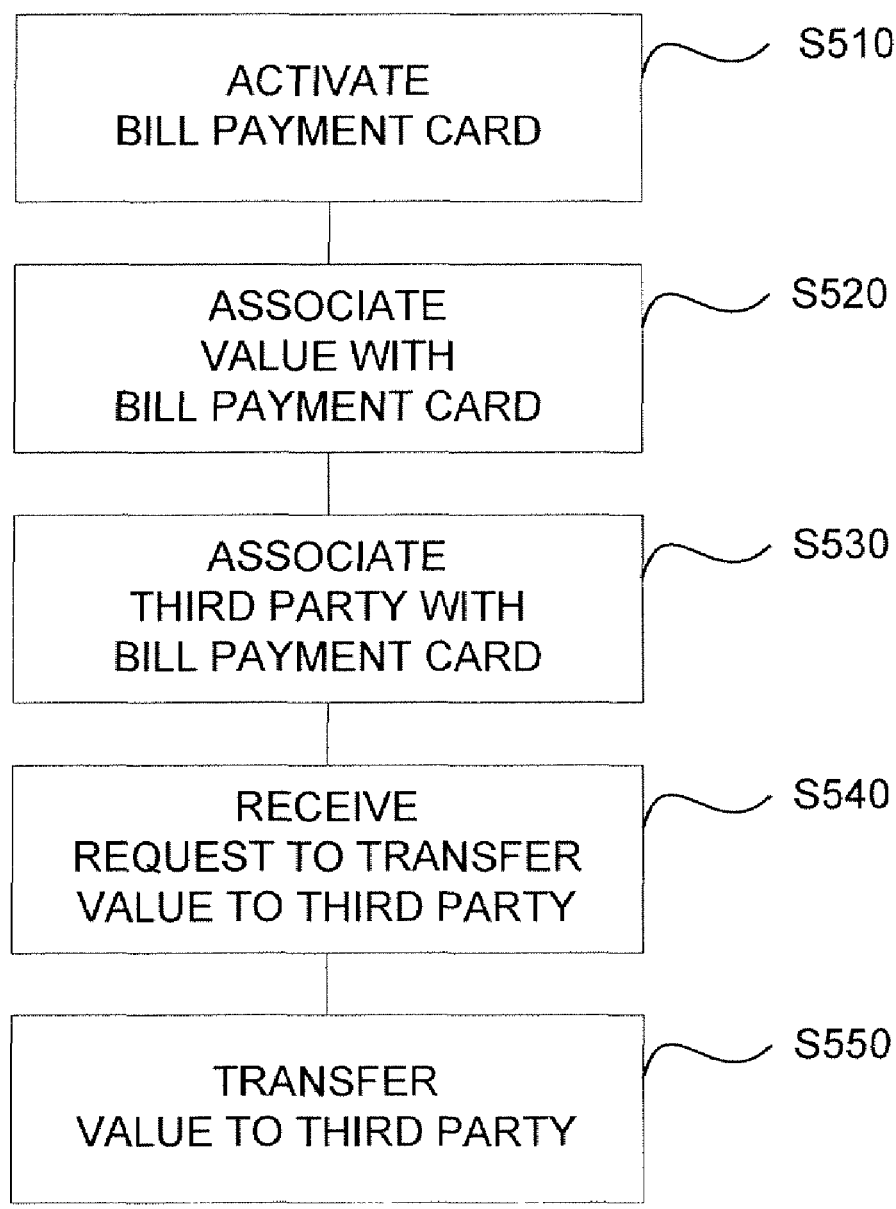
FIG. 5 is a flowchart illustrating a method for managing a bill payment system in accordance with some embodiments of the invention.

With reference to FIG. 5, a method for managing a bill payment card system in accordance with some embodiments of the invention will now be discussed. In step S510, a processor may activate a bill payment card. The bill payment card may be activated upon purchase, or may be activated prior to or after being purchased.

In step S520, the processor may associate value with a bill payment card. The value may be associated when the bill payment card is activated or may be associated subsequent to the bill payment card being activated. In some embodiments of the invention, a customer may purchase a bill payment card at a retail location using money value, and some or all of the purchase money value may be associated with the bill payment card. The association of value with a bill payment card may take any form; for example, the association may be performed by modifying a record in a database, wherein the record is associated with a bill payment card. The value may also be transferred to an account associated with the bill payment card, or the bill payment card may be associated with a unique identifier that a database record and/or bill payment card account is associated.

In step S530, the processor may associate a third party with the bill payment card. The third party may be a biller that a bill pay card user owes money, or may be a particular provider of goods and/or services with whom the bill payment card user foresees a future relationship. The processor may modify a database record that is associated with the bill payment card, so that the record includes information sufficient to identify the third party. The processor may associate a single third party or multiple third parties with a bill payment card. In some embodiments of the invention, the processor may determine which third party or third parties to associate with the bill payment card. Alternatively, a bill payment card user may determine which third party or third parties to associate with a bill payment card. Additionally, information sufficient to identify the third party may include customer account information of a bill payment card user. For example, a bill payment card user may enter an account number, which the processor may recognize as an account number with a particular provider.

In step S540, a processor may receive a request to transfer value to a third party. The request may take the form of text messages or SMS communications. The processor may receive the request directly from a bill payment card user, or the processor may receive the request through an intermediary, such as a retailer. The third party may be a party other than the bill payment card user allowing the bill payment card user to direct a payment of value to another party, or may be the bill payment card user himself or herself, allowing a disbursement of value to the bill payment card user. The request to transfer value may include an indication of the amount of value to transfer, which may be the amount due or some other amount up to the amount available on the bill payment card.

In step S550, a processor may transfer the value to the third party. In some embodiments of the invention, the processor may only initiate the transfer of value, directing another entity to perform the transfer, or the processor may transfer the value directly. The transfer of value may take any form, such as by electronically transferring the value, e.g., through the Automated Clearing House (ACH) Network or by other means, or by mailing the value, e.g., in the form of a check.

Figure 6:
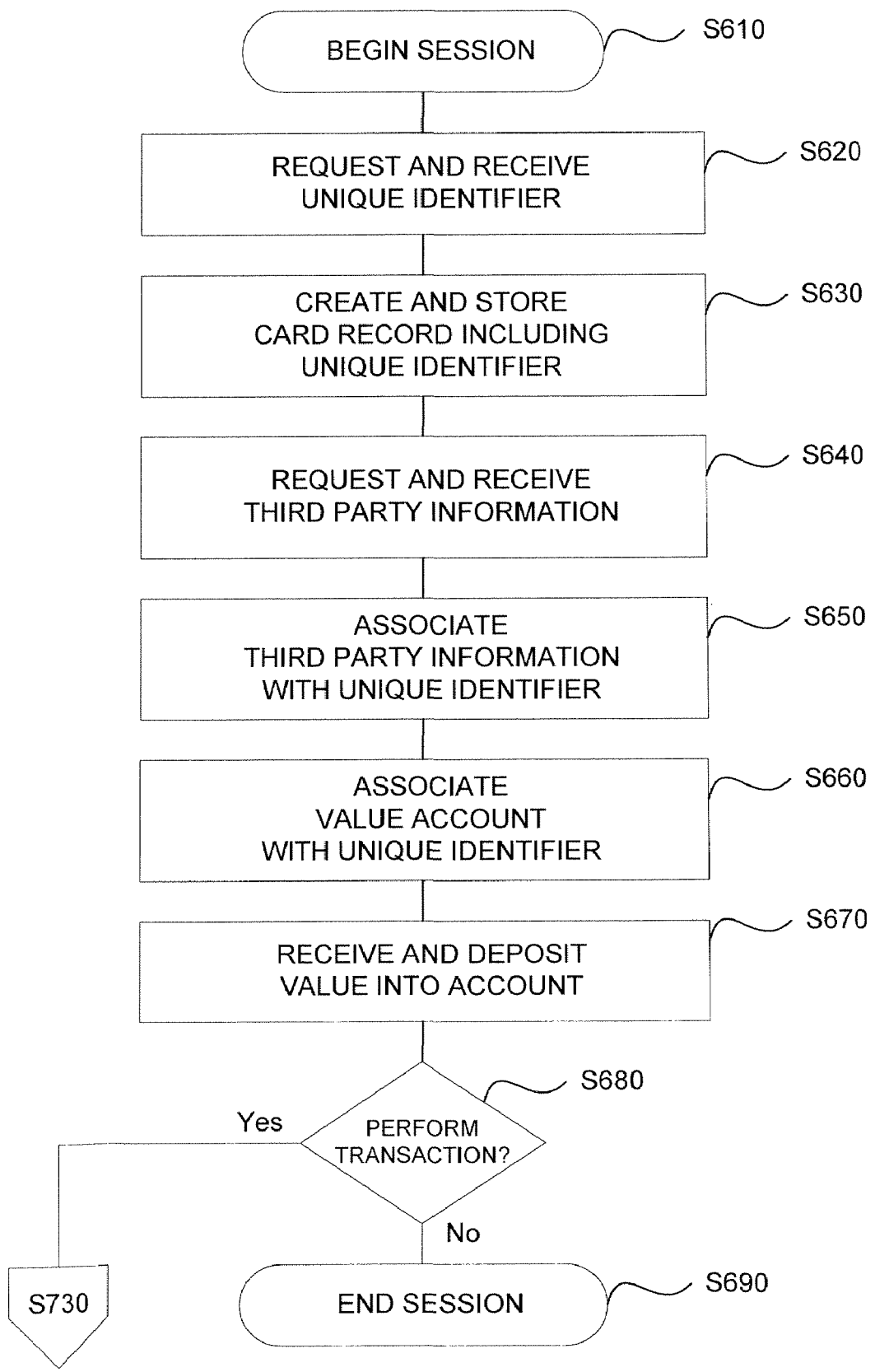
FIG. 6 is a flowchart illustrating a method for managing an initial use of a payment system that utilizes SMS communications in accordance with some embodiments of the invention.

With reference to FIG. 6, a method for managing an initial use of a bill payment card in a bill payment system for transferring value to one or more third parties using a bill payment card in accordance with some embodiments of the invention will now be discussed. An initial use of a bill payment card may generally comprise activating a bill payment card, associating value with the bill payment card, associating a third party with the bill payment card, and/or performing a transaction using the bill payment card.

In step S610, a processor may begin a session upon receiving a communication from a bill payment card user or an intermediary, e.g., a retailer. Such a communication may be in various forms, and its form may depend on the party initiating the communication. For example, the communication may be received in the form of text messaging, SMS, etc.

In step S620, a processor may request and receive a transmission of a unique identifier associated with a bill payment card. The unique identifier may be a number visible on the face of a bill payment card or some other form of indicia associated with a bill payment card. The transmission may include a unique identifier or may include information sufficient to determine the unique identifier.

In step S630, a processor may create a bill payment card record associated with the unique identifier, and may store the bill payment card record in a database. The bill payment card record may be created and stored before, during, or after an initial use of a bill payment card. For example, a bill payment card record may be created and stored prior to distribution of a bill payment card to the retailer or sale to a user, prior to activation of a bill payment card, and/or during the purchase of a bill payment card. Association with a unique identifier may occur by modifying the bill payment card record to include the unique identifier or by some other modification of the bill payment card record sufficient to associate it with the unique identifier.

In step S640, the processor may request and receive third party information that may comprise any information sufficient to identify the third party. In some embodiments of the invention, third party information may include a customer account number, a name, an address, SMS, mobile number and/or a telephone number of the third party. Third party information may also comprise information related to a bill payment card user that may be verified with a third party, e.g., a bill payment card user's SMS, mobile number, telephone number or address that is on record with the third party.

In step S650, a processor may associate a third party with the unique identifier of the bill payment card. The processor may modify the bill payment card record to include information sufficient to identify a third party. For example, the bill payment card record may be modified to include a customer's account number with the third party.

In step S660, the processor may associate an account with the unique identifier. The account may be able to receive and hold some type of value (e.g., money, credits, etc.) therein. For example, the processor may associate the unique identifier with a bank account, which is able to receive funds associated with the bill payment card.

In step S670, the processor may receive and deposit value into an account associated with a bill payment card. For example, a user may purchase a bill payment card, and the processor may subsequently receive the purchase amount and deposit some or all of the purchase amount into a financial account associated with the bill payment card.

In step S680, the processor may query the user to determine whether the user wishes to perform a transaction with the bill payment card. If the user chooses not to perform a transaction, the processor may end the session, in step S690. If the user chooses to perform a transaction, the processor may then begin a transaction, in step S730.

Figure 7:
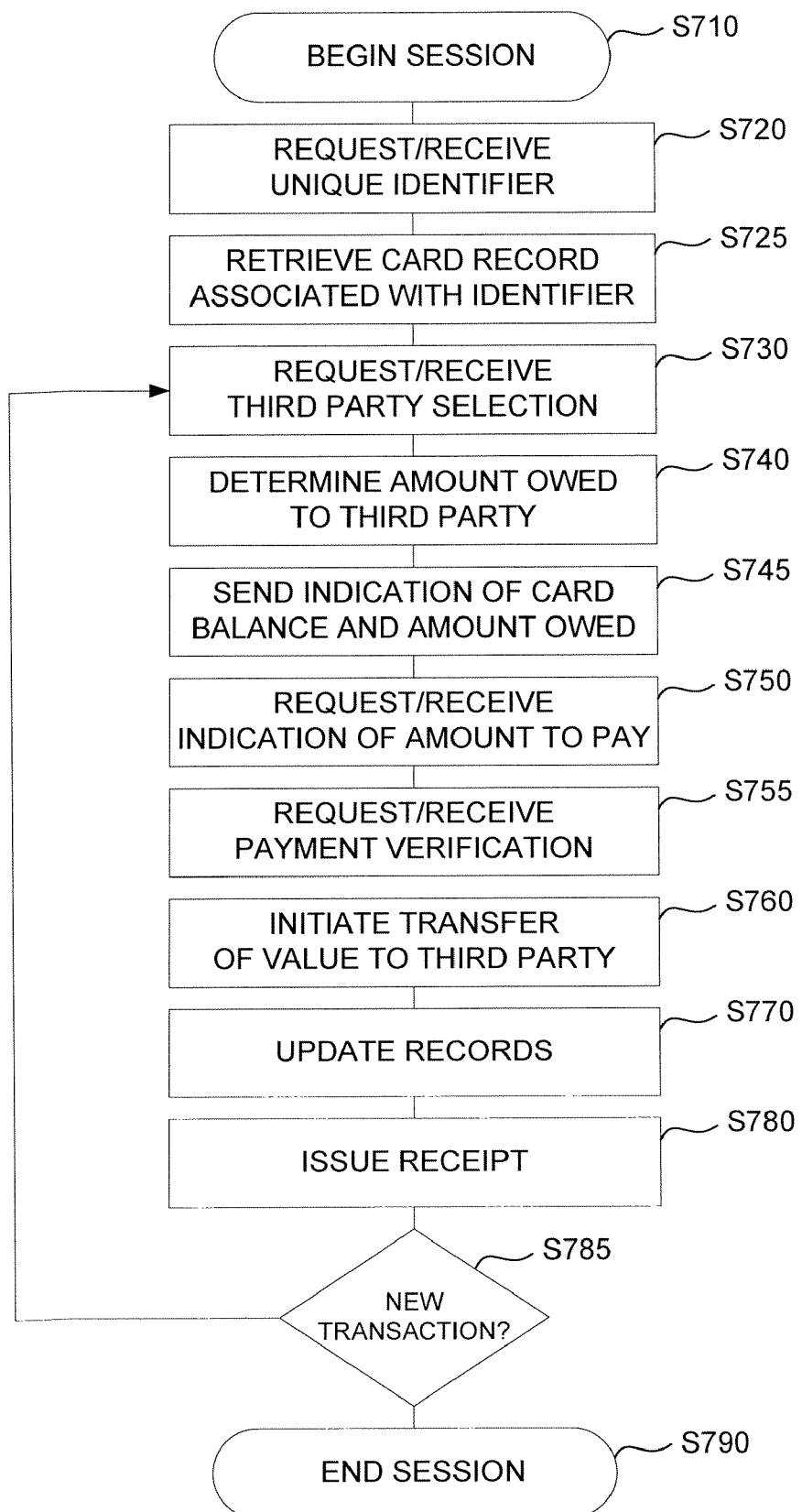
FIG. 7 is a flowchart illustrating a method for managing a transaction involving a bill payment system in accordance with some embodiments of the invention.

A method for managing a transaction involving a bill payment card system for transferring value to one or more third parties using a bill payment card in accordance with some embodiments of the invention will now be discussed, and is illustrated in FIG. 7.

In steps S710 and S720, similarly to the aforementioned steps S610 and S620 described above, the processor may begin a session and request and receive a unique identifier associated with a bill payment card. In step S725, the processor may retrieve from a database a bill payment card record associated with a unique identifier. The processor may retrieve some or all of the data located in the bill payment card record, e.g., a list of third parties associated with the bill payment card.

In step S730, the processor may request and may receive from a user a selection of which third party to associate with the transaction, i.e., which third party to transfer value to. For example, during a SMS transaction, the processor may communicate to the user a list of third parties, and the user may be able to press a key to select the desired third party. The processor may then upon receiving the user's selection, the processor may determine the selected third party based on the selection. In some embodiments of the invention, step S730 may be skipped, such as where there is only one third party associated with a bill payment card.

In optional step S740, the processor may determine an amount owed to a third party. For example, in some embodiments of the invention, the processor may manage a payment by a customer to a biller that has billed the user for services rendered. In such an example, there may be a particular amount due to the biller, which the processor may determine. The processor may determine an amount owed by communicating with the third party and/or with the bill payment card user. The communication may occur during the transaction, or it may occur before or after the transaction takes place.

In step S745, the processor may send an indication of a balance associated with the bill payment card and may send an indication of an amount owed to the third party via SMS communications. The balance may include a dollar amount available associated with the bill payment card, or the card balance may include some other measure of value, (e.g., credits) available. In some embodiments of the invention, the processor may warn the user when the card balance is less than the amount owed.

In step S750, the processor may request and may receive from a user an indication of an amount of value to transfer to a third party. In some embodiments of the invention, the processor may give the user the option to indicate to the processor that the user desires to pay the amount due. For example, the processor may give the user the option via SMS communication to press "1" on a SMS keypad in order to pay the amount due.

In optional step S755, the processor may request and may receive a payment verification. The payment verification may comprise presenting to the user a summary of the transaction, e.g., the name of the third party and the amount of value that will be transferred. A payment verification may also include requesting the user to verify that the information is correct and that the transfer of value is still desired.

In step S760, the processor may initiate a transfer of value to a third party, e.g., making value associated with the bill payment card unavailable to a user, modifying a record associated with the bill payment card, requesting a bank to transfer value, etc. Initiating a transfer may or may not include actually transferring value to a third party. For example, the transfer of value may be performed by an entity separate from the processor, or the transfer of value may occur at a time subsequent to the transaction.

In step S770, the processor may update records associated with the bill payment card transaction. For example, the processor may create and store a transaction record that includes any type of information related to the transaction. In another example, the processor may modify an existing record, e.g., a bill payment card record, third party record, user record, etc., to include any type of information related to the transaction. Information related to the transaction may include the third party to whom value was transferred to, how much value was transferred, the time and place of the transaction, etc.

In step S780, the processor may issue a receipt to the user. The receipt may be issued in any form, e.g., an SMS message a printed paper receipt, an e-mail, a receipt indicated on a webpage that may be printed by the user, and/or a postal letter. The receipt may include any type of information related to the transaction and/or additional information related to the bill payment card, e.g., card balance information.

In step S785, similarly to step S680, the processor may give the user the option to perform an additional transaction during the session. If the user chooses to perform an additional transaction, some or all of the transaction steps may be repeated, for example starting at step S730. If the user chooses to end the session, then the processor may end the session in step S790.

Additional steps may be included in managing a transaction that are not illustrated in FIG. 7, as described elsewhere herein. A processor may perform one, some, or all of the steps illustrated in FIG. 6 during a transaction, e.g., adding or removing third parties from being associated with a bill payment card, associating value (or additional value) with a bill payment card, receiving and depositing value into an account associated with a bill payment card, etc.

Figure 8:
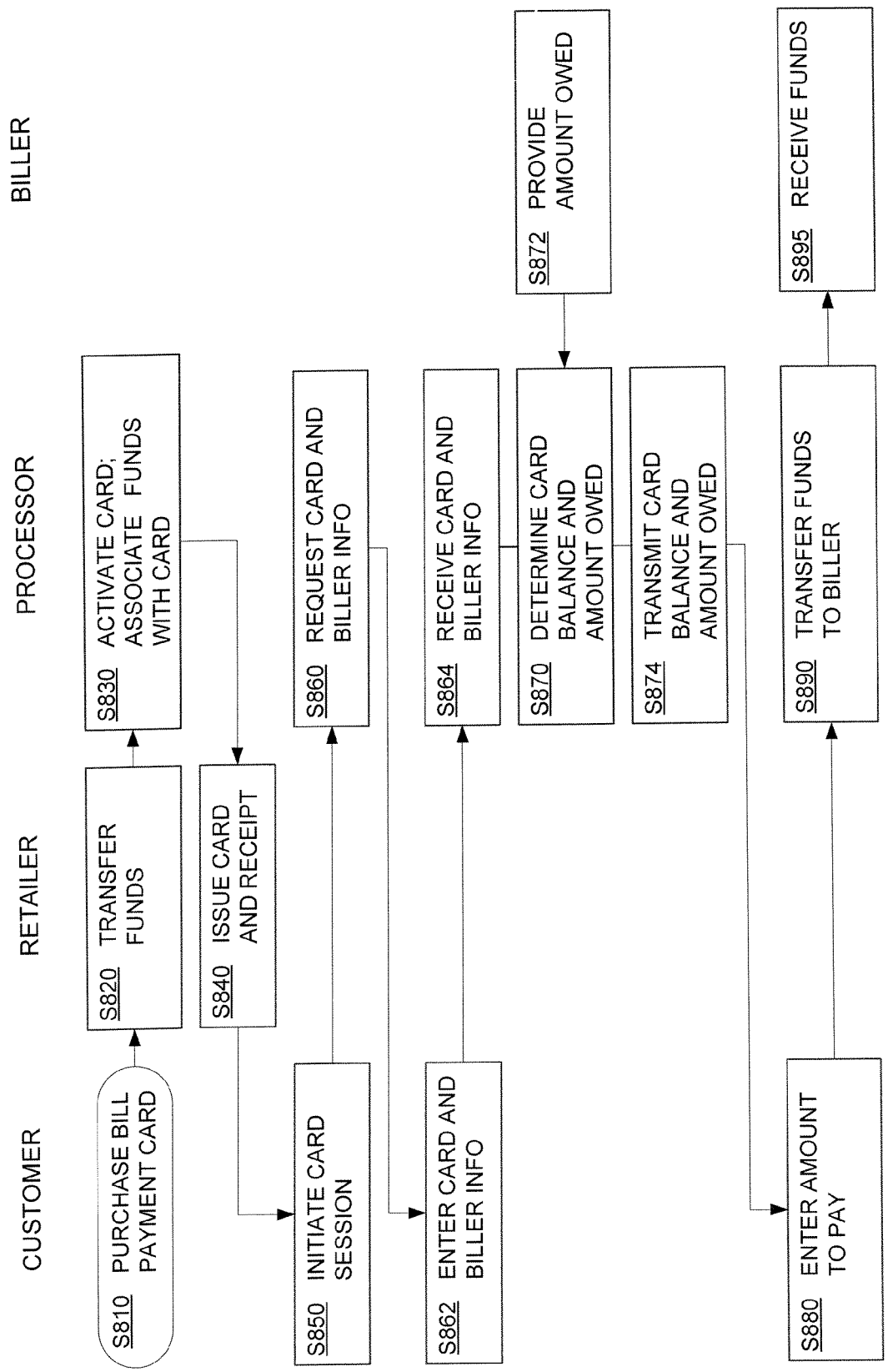
FIG. 8 is a flowchart illustrating a method for making payments to one or more billers by a customer using SMS communications in accordance with some embodiments of the invention.
Figure 9:
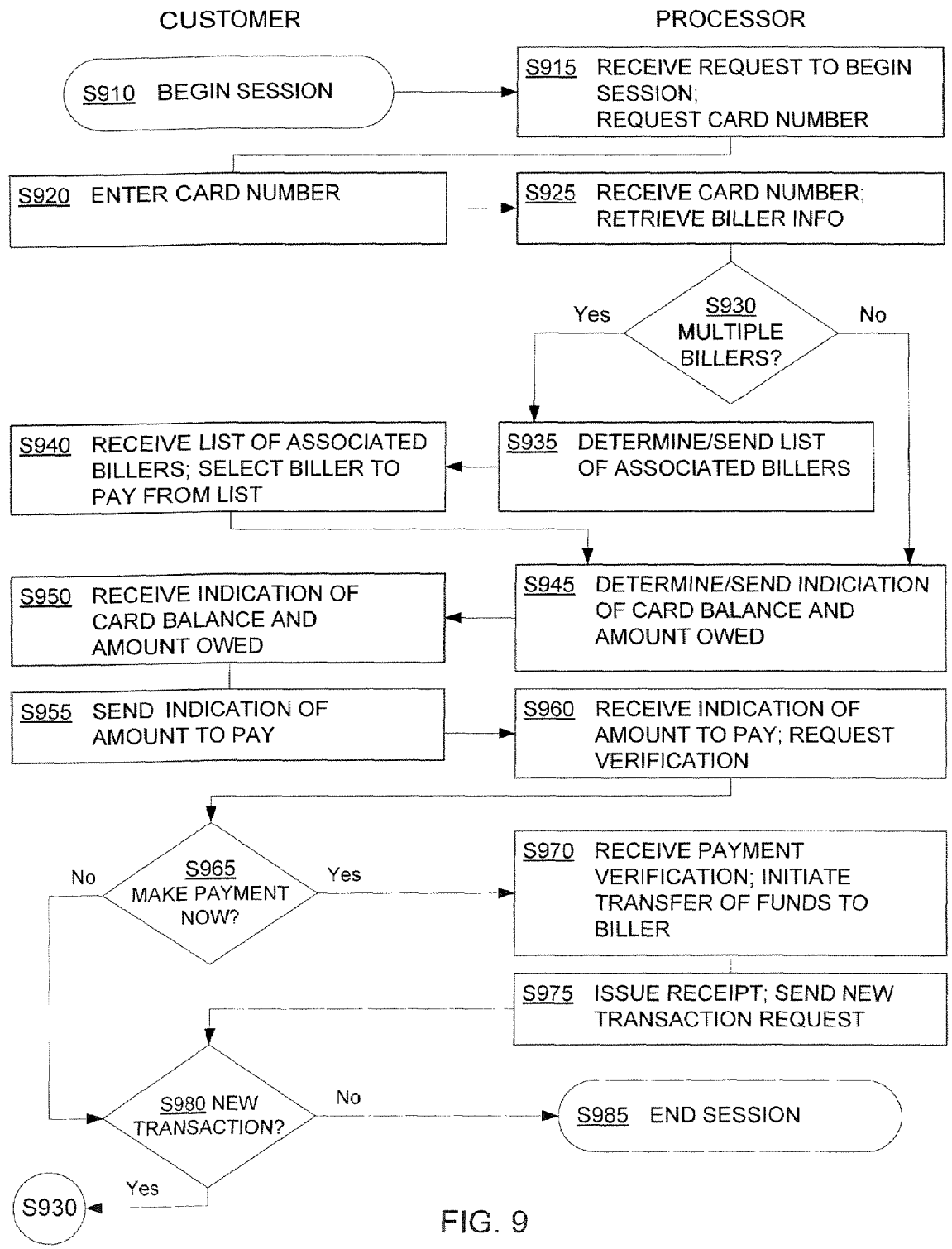
FIG. 9 is a flowchart illustrating a method for performing a transaction involving a bill payment system in accordance with some embodiments of the invention.
Figure 10:
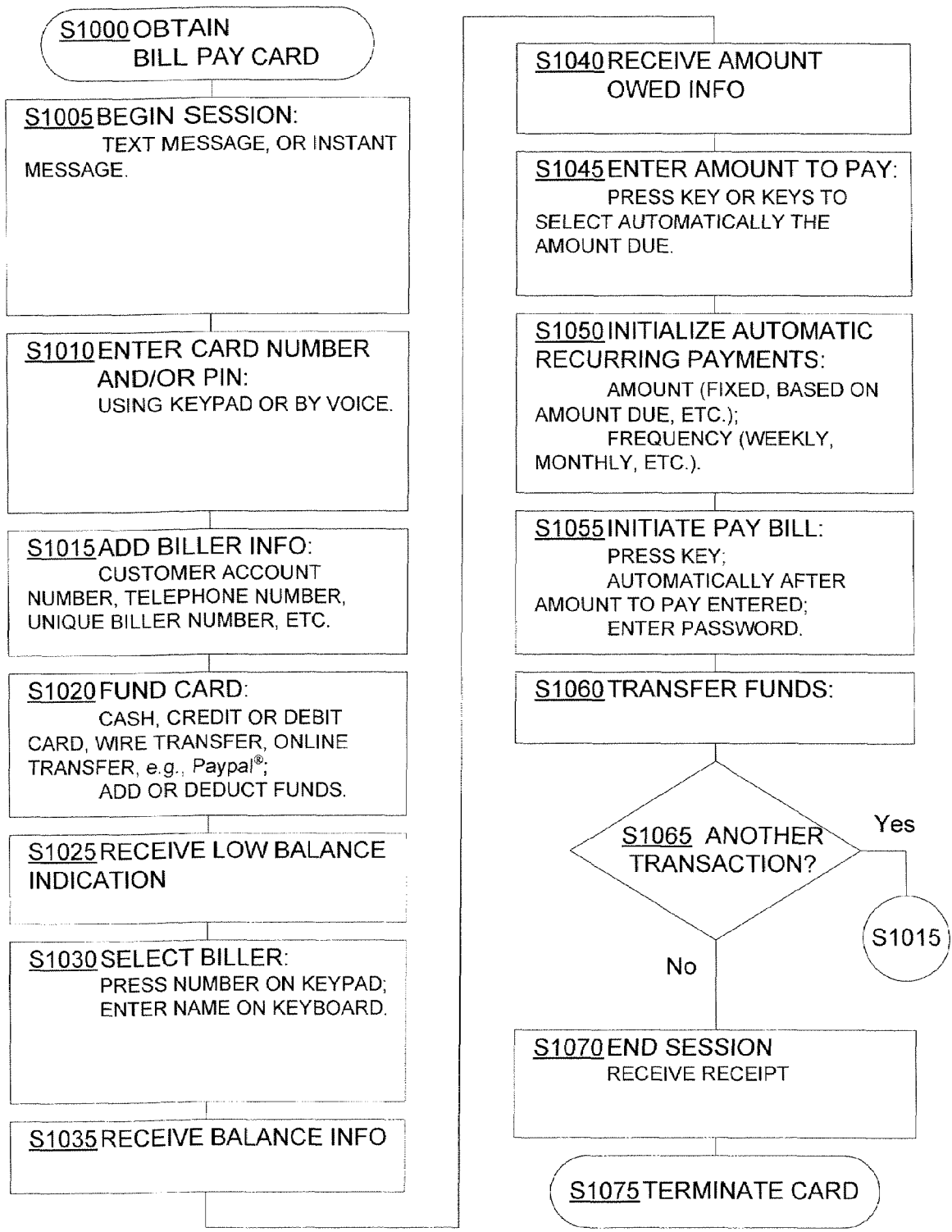
FIG. 10 is a flowchart illustrating a method for making payments to a biller using a payment system in accordance with some embodiments of the invention.

FIGS. 8-10 are flowcharts illustrating various embodiments of the invention. For illustrative purposes only, FIGS. 8-10 exemplify methods for a user to purchase a bill payment card from a retailer in order and make a money payment to a biller using the bill payment card. The present invention contemplates embodiments beyond those illustrated in FIGS. 6-8, for example, where the third party is not a biller and where the value transferred to the biller is not a money payment, but rather some other form of value.

FIG. 8 illustrates a method for making payments to one or more billers by a user of a bill payment card purchased from a retailer in accordance with some embodiments of the invention.

In step S810, a user may purchase a bill payment card at a retailer. In step S820, the retailer may receive value from the user and transfer some or all of the value to a processor. Instead of, or in addition to, transferring value, the retailer may send information about the transaction, e.g., user information and card information, to a biller. Additionally, value may be transferred by the retailer at a later time subsequent to the transaction occurring. In step S830, the processor may receive the value, activate the bill payment card, and associate the value with the bill payment card. For example, the processor may associate an account with the bill payment card during the activation process, and then deposit the value into the account. In step S840, the retailer may provide an activated bill payment card to a user, along with a receipt. The receipt may indicate the amount of value available for use.

In step S850, the user may initiate a session for using the bill payment card, for example, by composing and sending an SMS communication. In step S860, the processor may begin a session with the user, requesting the user to enter card and biller information. For example, the processor request the user enter a unique identifier associated with the card, such as a card number and/or password. In addition, the processor may provide a list of billers associated with the card, from which the user may select the biller to receive the transferred funds. In step S862, the user may enter the card and biller information, which the processor may receive in step S864.

In step S870, the processor may determine the balance of value available that is associated with a bill payment card, and may determine an amount to provide to a selected biller. The processor may determine the available balance by retrieving a database record that is associated with the bill payment card. In step S872, a biller may provide an indication of an amount owed by the user. In step S874, an indication of the balance associated with the bill payment card and an indication of an amount owed to a biller is transmitted to the user. In some embodiments of the invention, the steps of determining and transmitting an amount owed and the biller providing an amount owed may be omitted.

In step S880, the user may enter an amount of value to transfer to a biller. In some embodiments of the invention, the processor may ask the user to make a selection in order to automatically pay the amount due to a biller. The user may also enter a specific amount to pay that is equal to, greater than, or less than an amount due. The processor may request verification of the amount entered by the user; for example, it may repeat the amount entered, and ask the user to verify the payment.

In step S890, the processor may transfer an amount of value requested by the user to a biller. The processor may initiate the transfer, directing another entity, such as a bank, to perform the actual transfer of value, or the processor may perform the actual transfer of value itself. The transfer of value may occur during or immediately after a transaction takes place. Alternatively, the transfer of value may occur sometime after the transaction takes place, for example, the transfers may be made periodically, e.g., daily or weekly, in batch form. In step 695, the biller may receive the value.

With reference to FIG. 9, a method for performing a transaction involving a bill payment card system in accordance with some embodiments of the invention will now be discussed.

In step S910, a user may begin a session using a bill payment card. In step S915, the processor may receive a request to begin a session from the user, and may respond by requesting a unique identifier associated with a bill payment card, e.g., a card number and/or password. In steps S920 and S925, the user may enter and the processor may receive, respectively, the unique identifier associated with the bill payment card. In step S925, the processor may also retrieve biller information associated with the bill payment card. The biller information may include a list of billers associated with the bill payment card.

In step S930, the processor may determine whether multiple billers are associated with the bill payment card, and if so, then the processor may send a list of associated billers to a customer at step S935. In step S940, the user may receive the list of billers and may select a particular biller to receive a transfer of value.

In step S945, the processor may determine a balance associated with a bill payment card and an amount owed to a selected biller and send an indication of this information to the user. The processor may instruct the user via SMS to press a single digit on a SMS keypad in order to pay the amount owed to a biller, or the user may be instructed to enter a specific amount of value to transfer to the selected biller. In step S950, the user may receive an indication of the balance of funds associated with the bill payment card, an amount owed to a particular biller and may request instruction to proceed. In step S955, the user may send an indication to proceed, which may comprise of an amount of value to transfer.

In step S960, the processor may receive an indication of an amount to pay and may optionally request verification of such amount. For example, the processor may present to the user a selected amount to pay in order to verify that it is the correct amount, and that the user still wishes to proceed with the transaction. In step S965, the user may verify the transfer, either choosing to authorize the transaction or cancel the transaction.

In step S970, the processor may receive verification of the transfer and may initiate the transfer of value to a biller the processor may initiate a transfer of value in several ways, e.g., making the value unavailable to the customer, modifying records associated with the bill payment card, and/or transferring the value from an account associated with the bill payment card.

In step S975, the processor may issue a receipt to the user indicating the substance of the transaction, and may ask the user whether the user wishes to perform an additional transaction. In step S980, the user may select whether or not to perform an additional transaction via SMS, such as by pressing one button on a SMS keypad for "yes" or another button on the SMS keypad for "no,". If the user chooses to perform an additional transaction, then the transaction process may repeat itself, for example, starting at step S930. In step S985, the processor may end a session.

With reference to FIG. 10, a method for making payments to a biller using a bill payment card system in accordance with some embodiments of the invention will now be discussed.

In step S1000, a user may obtain a bill payment card. The user may obtain the bill payment card in any fashion, such as at a retail location, through the mail from a biller, or by ordering the card via SMS or by mail, telephone, or the Internet.

In step S1005, the user may begin using the card by initiating a session. In step S1010, the user may provide to a processor a unique indicia associated with the bill payment card, e.g., a card number. The unique indicia may comprise alpha characters, numeric characters, alphanumeric characters, and/or other types of symbols. In some embodiments of the invention the user may provide the unique indicia by pressing the numbers on the SMS keypad. The user may also enter the unique indicia using a keyboard and/or keypad by using the Internet via a computer, cellular telephone, text messaging system, SMS, and/or instant messaging system.

In step S1015, biller information may be associated with the bill payment card. This association may allow the user to select a biller that may receive a payment made by the user using the bill payment card. The biller information may be associated with the bill payment card before, during, and/or after the user obtains the bill payment card. In some embodiments of the invention, the bill payment card may be associated with one or more billers prior to the user obtaining the bill payment card, such that the user purchases the bill payment card for the purpose of making current and/or future payments to the biller or billers already associated with the bill payment card. Further, there may be indicia on the bill payment card telling the user when purchasing the bill payment card which billers are associated with the bill payment card. For example, the bill payment card may be branded with a trademark or logo of a particular provider of goods or services, thereby indicating to the user that the bill payment card may be used to pay that particular provider of goods or services.

In some embodiments of the invention, the user may be able to add and remove billers associated with the bill payment card during and/or after obtaining the bill payment card. There may be a number of ways by which the user could add and remove billers. In some embodiments of the invention the user may be prompted to and may enter the billing information, which may include an account number and/or a telephone number via SMS communications.

In step S1020, value may be added to the bill payment card. The value may be loaded on the bill payment card at a retail location when a user purchases the bill payment card, and/or may be added at time subsequent to obtaining or purchasing the bill payment card, such as by returning to the retail location and/or by using a self-service kiosk, SMS, a telephone, or the Internet. The value may be loaded manually or automatically. The user may load the value manually, for example, by inserting or swiping the bill payment card at a POS terminal and then providing payment, such as by using a bill reader or a deposit envelope, the value of which is then loaded on the bill payment card or transferred into an account associated with the bill payment card. In addition, the user may load the value automatically by associating the bill payment card with a checking and/or savings account, where value may be transferred anytime by request of the user from the checking or savings account to the bill payment card or an account associated with the bill payment card. The loading of value may also be fully automatic whereby a certain amount of value is transferred periodically—daily, weekly, monthly, or some other period of time—from the user's account to the account associated with the bill payment card.

In optional step S1025, the user may be notified when the bill payment card and/or an account associated with the bill payment card reaches a low balance, which may be set at a predetermined amount by a processor and/or by the user. The notification may occur by e-mail, text message, SMS, instant message, etc. The notification may also occur in response to the use of the bill payment card, such as, by way of example only, on a receipt.

In step S1030, if more than one biller is associated with the bill payment card, the user may select the particular biller to which the user desires to make a payment. In some embodiments of the invention, such as when the user uses SMS, a telephone or other keypad-enabled device to initiate the transaction, the user may be verbally or by text given a list of billers along with a corresponding number or numbers to press to select a particular biller. Alternatively, instead of being given a list of billers, the user may be prompted and may enter a biller number, account number, telephone number, and/or password that identifies the selected biller.

In step S1035, the user may receive information regarding the amount of the value available on the bill payment card and/or an account associated with the bill payment card. In some embodiments of the invention, the system may automatically provide the user with a balance available when the user initiates a transaction, selects a biller, and/or completes a transaction.

In step S1040, the amount owed to the biller may be communicated to the user. In some embodiments of the invention, the amount due to the selected biller may be automatically communicated to the user after communicating the amount of value available to the user and/or after the user selects the biller. If the user is performing the transaction with a visual display device, such as a SMS, computer, POS, kiosk, and/or cellular phone, the visual display device may display the biller's name, the amount due to the biller, and/or a list of the billers' names and the amount due to each biller. The information regarding the amount due, the balance of value available, and/or the total amount due all billers may be communicated simultaneously to the user. This may allow the user to view the balance available, a list of the billers' names, the amount due to each biller, and/or the total amount due on one screen.

In step S1045, the user may enter the amount to provide to the selected biller. In some embodiments of the invention, the user may press a single button in order to select an amount to provide to the biller equal to the amount due. For example, after the user receives information regarding the amount of value available and the amount due to the biller, the user may be instructed via SMS to press a button, such as the "1" button on a SMS keypad, to provide the amount due. The user may also be given the option to enter a specific amount, i.e., an amount above, below, or equal to the amount due. In such a case, the user may enter the specific amount using a SMS keypad device or speaking into an input device, such as a telephone.

In optional step S1050, in addition to having the option to make a single payment, the user may be given the option of setting up automatic recurring payments to the biller or billers. In some embodiments of the invention, the user may choose to have a fixed amount transferred the same day each month from the value located on the bill payment card or in an account associated with the bill payment card to a processor or the biller. Where the bill payment card is associated with multiple billers, the user may select different automatic payment terms—amount, frequency, date, etc., of each payment—for each biller. In addition, the user may make automatic recurring payments to some billers while making manual payments to other billers.

In step S1055, the payment to the biller may be initiated. In some embodiments of the invention, the biller name, amount due, and amount selected to pay may be communicated to the user, who may then be instructed to verify and initiate the payment. The user may verify the payment through any means, for example, pressing a number or series of numbers on a keypad or selecting a button on the screen. Additionally, the verification may require the user to enter a password to initiate payment. Alternatively, such as where the user selects to pay the amount due, the payment may be initiated automatically, without verification, after the user selects to pay the amount due, such as by pressing a single digit on a SMS or telephone key pad, and/or enters the amount to pay.

In step S1060, value may be transferred from the bill payment card or an account associated with the bill payment card to the biller. In some embodiments of the invention, the value may be immediately transferred some time after the user enters payment verification. Alternatively, value may be made immediately unavailable to the bill payment card holder, but then transferred at a later time to the biller. The value may be transferred to the biller directly and/or through a processor. For example, a processor may transfer value from multiple users to a biller in a single monthly transaction.

Available value may also be disbursed from the bill payment card or an account associated with the bill payment card to the bill payment card user. Available value may be value that has been loaded onto the bill payment card or an account associated with the bill payment card, but has not yet been made unavailable, such as by initiating the transfer of such value to a biller. Value may be removed in a similar manner to the method of adding value.

In step S1065, the user may choose to perform another transaction or end the transaction. In some embodiments of the invention, after initiating the payment to a biller, the user may be instructed to press a button or to say "Yes" to make another payment to the same and/or different biller.

In step S1070, after completing a transaction and/or after completing a session where the user completes multiple transactions, a receipt may be displayed or issued to the user. In addition, the user may receive a receipt via SMS, e-mail, text-messaging system, and/or instant-messaging system. In some embodiments of the invention, a statement summarizing transactions associated with the bill payment card for a given period may be sent to the user on a periodic basis, e.g., monthly, quarterly, and/or yearly.

In step S1075, use of the bill payment card may be terminated. Termination may occur in a number of ways, including, but not limited to, deactivation and/or expiration of the bill payment card.

The embodiments of the present inventions are not to be limited in scope by the specific embodiments described herein. For example, although many of the embodiments disclosed herein have been described with reference to stored value cards and wireless phone accounts, the principles herein are equally applicable to any other type of value identifier or indicia and any other type of account. Also, although many of the embodiments have been described in reference to bill payment of an account, the principles herein are equally applicable to other systems and methods of adding or activating value in an account. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A method of managing a payment system utilizing short messaging Service (SMS) communications, comprising:
   activating a bill payment card;
   associating a value with the bill payment card;
   associating a third party with the bill payment card;
   receiving an identifier associated with the bill payment card via a short messaging service (SMS) communication;
   determining an amount of value associated with the bill payment card;
   providing an indication of the amount of value associated with the bill payment card to the bill payment card user via SMS communications;
   receiving a request from the bill payment card user to transfer at least some of the value to the third party via SMS communications; and
   initiating a transfer of the at least some of the value to the third party.

2. The method of claim 1, further comprising:
 transferring at least some of the value to the third party.

3. The method of claim 1, wherein the step of associating a third party with the bill payment card comprises:
 receiving information via short messaging services (SMS) communications sufficient to identify the third party.

4. The method of claim 3, wherein the information sufficient to identify the third party comprises information sufficient to identify a customer account with the third party.

5. The method of claim 1, wherein the step of receiving a request from the bill payment card user to transfer at least some of the value to the third party comprises:
 receiving an indication via SMS communications of an amount of value to transfer.

6. The method of claim 5, further comprising:
 determining an amount owed to the third party; and
 providing to the bill payment card user via SMS communications an indication of the amount owed to the third party.

7. The method of claim 1, wherein at least a second third party is associated with the bill payment card.

8. The method of claim 1, wherein the step of receiving a request from the bill payment card user to transfer at least some of the value to the third party via SMS communications comprises a code identifying the third party.

9. The method of claim 8, wherein the bill payment card user obtains the code from a website.

\* \* \* \* \*